United States Patent
Mori et al.

(10) Patent No.: US 12,155,330 B2
(45) Date of Patent: Nov. 26, 2024

(54) POWER CONVERSION DEVICE AND ELECTRIC POWER STEERING DEVICE

(71) Applicant: Mitsubishi Electric Corporation, Tokyo (JP)

(72) Inventors: Tatsuya Mori, Tokyo (JP); Akira Furukawa, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 452 days.

(21) Appl. No.: 17/426,155

(22) PCT Filed: Feb. 19, 2019

(86) PCT No.: PCT/JP2019/006008
§ 371 (c)(1),
(2) Date: Jul. 28, 2021

(87) PCT Pub. No.: WO2020/170324
PCT Pub. Date: Aug. 27, 2020

(65) Prior Publication Data
US 2022/0103110 A1   Mar. 31, 2022

(51) Int. Cl.
*H02P 27/08* (2006.01)
*B62D 5/04* (2006.01)
*H02M 1/00* (2007.01)
*H02M 7/537* (2006.01)

(52) U.S. Cl.
CPC ............... *H02P 27/08* (2013.01); *B62D 5/04* (2013.01); *H02M 1/0009* (2021.05); *H02M 7/537* (2013.01)

(58) Field of Classification Search
CPC ............ H02M 7/42; H02M 7/44; H02M 7/48; H02M 7/515; H02M 7/537; H02M 7/5387;
(Continued)

(56) References Cited

U.S. PATENT DOCUMENTS

| | | | |
|---|---|---|---|
| 2011/0080125 A1* | 4/2011 | Shimada | H02P 21/0003 318/400.09 |
| 2015/0249409 A1 | 9/2015 | Nakajima et al. | |
| 2019/0131887 A1* | 5/2019 | Mori | H02M 1/08 |

FOREIGN PATENT DOCUMENTS

| | | |
|---|---|---|
| JP | 2004-336876 A | 11/2004 |
| JP | 2006-81396 A | 3/2006 |

(Continued)

OTHER PUBLICATIONS

English translation of WO 2017/221339. (Year: 2017).*
(Continued)

*Primary Examiner* — Thienvu V Tran
*Assistant Examiner* — Carlos O Rivera-Perez
(74) *Attorney, Agent, or Firm* — Sughrue Mion, PLLC; Richard C. Turner

(57) ABSTRACT

A power conversion device is configured to acquire, from a current detector at a timing A, a first phase current detection value in a first phase being a phase corresponding to a phase voltage command to be compared to a first carrier wave signal, calculate a first phase current calculation value corresponding to the first phase based on an acquisition result, acquire, from the current detector at a timing B, a second phase current detection value in a second phase being a phase corresponding to a phase voltage command to be compared to a second carrier wave signal, and to calculate a second phase current calculation value corresponding to the second phase based on an acquisition result.

17 Claims, 12 Drawing Sheets

(58) Field of Classification Search
CPC ......... H02M 7/53871; H02M 7/53873; H02M 7/53875; H02M 7/53878; H02M 7/539; H02M 7/5395; H02M 1/0003; H02M 1/0009; H02M 1/0025; H02P 27/00; H02P 27/02; H02P 27/06; H02P 27/08; H02P 27/085; B62D 5/00; B62D 5/04
USPC ................ 363/16, 40–43, 74, 123, 131–134; 323/212, 217, 271, 275–278, 280, 323/282–285, 351
See application file for complete search history.

(56) References Cited

FOREIGN PATENT DOCUMENTS

| | | |
|---|---|---|
| JP | 2010-011540 A | 1/2010 |
| JP | 5447136 B2 | 3/2014 |
| WO | 2014/080497 A1 | 5/2014 |
| WO | 2015/025622 A1 | 2/2015 |
| WO | 2017/221339 A1 | 12/2017 |

OTHER PUBLICATIONS

English translation of JP 2006081396. (Year: 2006).*
Investigating R&D Committee on Sorting Sensorless Vector Control of Institute of Electrical Engineers of Japan, "Sensorless Vector Control of AC Drive System," Ohmsha, Ltd., Sep. 25, 2016, p. 70 (see Tables 1.3).
Written opinion for PCT/JP2019/006008 dated Apr. 9, 2019.
International search report for PCT/JP2019/006008 dated Apr. 9, 2019.
Extended European Search Report dated Feb. 2, 2022 in European Application No. 19916119.1.

* cited by examiner

| Qup | Qun | Qvp | Qvn | Qwp | Qwn | VOLTAGE VECTOR | Iins |
|---|---|---|---|---|---|---|---|
| 0 | 1 | 0 | 1 | 0 | 1 | V0 | 0 |
| 1 | 0 | 0 | 1 | 0 | 1 | V1 | Ius_cal |
| 1 | 0 | 1 | 0 | 0 | 1 | V2 | -Iws_cal |
| 0 | 1 | 1 | 0 | 0 | 1 | V3 | Ivs_cal |
| 0 | 1 | 1 | 0 | 1 | 0 | V4 | -Ius_cal |
| 0 | 1 | 0 | 1 | 1 | 0 | V5 | Iws_cal |
| 1 | 0 | 0 | 1 | 1 | 0 | V6 | -Ivs_cal |
| 1 | 0 | 1 | 0 | 1 | 0 | V7 | 0 |

| θi [deg] | VOLTAGE SHIFT METHOD |
|---|---|
| 30≦θi＜90 | SECOND VOLTAGE SHIFT METHOD ( FIG. 9 ) |
| 90≦θi＜150 | FIRST VOLTAGE SHIFT METHOD ( FIG. 8 ) |
| 150≦θi＜210 | SECOND VOLTAGE SHIFT METHOD ( FIG. 9 ) |
| 210≦θi＜270 | FIRST VOLTAGE SHIFT METHOD ( FIG. 8 ) |
| 270≦θi＜330 | SECOND VOLTAGE SHIFT METHOD ( FIG. 9 ) |
| -30≦θi＜30 | FIRST VOLTAGE SHIFT METHOD ( FIG. 8 ) |

POWER CONVERSION DEVICE AND ELECTRIC POWER STEERING DEVICE

CROSS-REFERENCE TO RELATED APPLICATIONS

This application is a National Stage of International Application No. PCT/JP2019/006008 filed Feb. 19, 2019.

TECHNICAL FIELD

The present invention relates to a power conversion device and an electric power steering device.

BACKGROUND ART

A related-art inverter device (for example, refer to Patent Literature 1) includes an inverter circuit, a controller, and a smoothing capacitor. The inverter circuit includes switching elements on a high electric potential side and switching elements on a low electric potential side. The controller is configured to control the inverter circuit. The smoothing capacitor is configured to smooth an output voltage.

In the inverter device described in Patent Literature 1, an evaluation equation for evaluating a magnitude of ripples of a current input to the inverter circuit is used when the switching elements of the inverter circuit are controlled to switch on and off. In this inverter device, the evaluation equation is used to select one of a first carrier waveform or a second carrier waveform as a carrier wave signal to be compared to phase voltage commands used to control phase voltages applied to a three-phase motor.

CITATION LIST

Patent Literature

[PTL 1] JP 5447136 B2

Non Patent Literature

[NPL 1] Investigating R&D Committee on Sorting Sensorless Vector Control of Institute of Electrical Engineers of Japan, "Sensorless Vector Control of AC Drive System," Ohmsha, Ltd., Sep. 25, 2016, p. 70 (see Tables 1 and 3)

SUMMARY OF INVENTION

Technical Problem

When, as a first example, a configuration of providing a current detector which is connected in series to the switching elements on the low electric potential side of the inverter circuit, and detects phase currents flowing through the three-phase motor is applied to the inverter device, it is required to consider timings for acquiring the currents. The current acquisition timing in this case means a timing at which the controller acquires a detection value of the current detector.

That is, in the above-mentioned inverter device, it is required to match the timing at which the switching element on the low electric potential side is turned on and the timing at which the current is acquired. However, in the above-mentioned inverter device, the timing at which the switching element on the low electric potential side is turned on changes in accordance with the selected carrier waveform, and the current acquisition timing thus changes accordingly.

Also when, as a second example, a configuration in which a current detector for detecting a bus current input from a DC power supply to the inverter circuit is provided and the phase current is acquired from the bus current detected by the current detector is applied to the above-mentioned inverter device, it is similarly required to consider the current acquisition timing.

As described above, it is required to consider the current acquisition timing in the above-mentioned inverter device, but the current acquisition timing is not specifically described in Patent Literature 1. Moreover, an accuracy of the value of the phase current acquired by the controller may deteriorate in accordance with the current acquisition timing.

The present invention has been made in view of the above-mentioned problem, and has an object to provide a power conversion device capable of suppressing deterioration of an accuracy of values of phase currents acquired by a controller, and an electric power steering device including the power conversion device.

Solution to Problem

According to one embodiment of the present invention, there is provided a power conversion device including: an inverter which includes a high electric potential-side switching element and a low electric potential-side switching element which are provided in correspondence with each phase of three phases, and is configured to invert a DC voltage output from a DC power supply to AC voltages by switching on/off the high electric potential-side switching elements and the low electric potential-side switching elements, and to output the AC voltages; a current detector which is connected in series to the respective low electric potential-side switching elements of the inverter, and is configured to detect respective values of phase currents in the three phases as phase current detection values; and a controller configured to calculate phase voltage commands in the three phases, and to control the inverter in accordance with the calculated phase voltage commands in the three phases, wherein the controller is configured to: compare the phase voltage command in at least one phase of the phase voltage commands in the three phases and a first carrier wave signal to each other, and compare the phase voltage command in a remaining phase of the phase voltage commands in the three phases and a second carrier wave signal different from the first carrier wave signal in phase by ½ cycle of a carrier wave cycle of the first carrier wave signal to each other, to thereby control the high electric potential-side switching elements and the low electric potential-side switching elements of the inverter to switch on and off; acquire, from the current detector at a timing A, a first phase current detection value as the phase current detection value in a first phase being a phase corresponding to the phase voltage command to be compared to the first carrier wave signal, and calculate a first phase current calculation value corresponding to the first phase based on the first phase current detection value acquired at the timing A; and acquire, from the current detector at a timing B, a second phase current detection value as the phase current detection value in a second phase being a phase corresponding to the phase voltage command to be compared to the second carrier wave signal, and calculate a second phase current calculation value corresponding to the second phase based on the second phase current detection value acquired at the timing B.

According to one embodiment of the present invention, there is provided a power conversion device including: an inverter which includes a high electric potential-side switching element and a low electric potential-side switching element which are provided in correspondence with each phase of three phases, and is configured to invert a DC voltage output from a DC power supply to AC voltages through switching on/off the high electric potential-side switching elements and the low electric potential-side switching elements, and to output the AC voltages; a current detector configured to detect, as a bus current detection value, a value of a bus current input from the DC power supply to the inverter; and a controller configured to calculate phase voltage commands in the three phases, and to control the inverter in accordance with the calculated phase voltage commands in the three phases, wherein the phase voltage commands in the three phases are set as a maximum phase voltage command, a medium phase voltage command, and a minimum phase voltage command in descending order of a magnitude of value, wherein the controller is configured to: apply a first voltage shift method of equally shifting the respective phase voltage commands in the three phases such that the maximum phase voltage command matches a maximum value of a first carrier wave signal or a second voltage shift method of equally shifting the respective phase voltage commands in the three phases such that the minimum phase voltage command matches a minimum value of the first carrier wave signal; compare the phase voltage command in at least one phase of the shifted phase voltage commands in the three phases and the first carrier wave signal to each other, and compare the phase voltage command in a remaining phase of the shifted phase voltage commands in the three phases and a second carrier wave signal different from the first carrier wave signal in phase by ½ cycle of a carrier wave cycle of the first carrier wave signal to each other, to thereby control the high electric potential-side switching elements and the low electric potential-side switching elements of the inverter to switch on and off; and acquire the bus current detection value from the current detector at each of a timing A and a timing B, and calculate, based on the bus current detection values acquired at the A and the timing B, a first phase current calculation value corresponding to a first phase being a phase corresponding to the phase voltage command to be compared to the first carrier wave signal and a second phase current calculation value corresponding to a second phase being a phase corresponding to the phase voltage command to be compared to the second carrier wave signal, and wherein the timing A and the timing B are timings different from each other, and are timings at which the bus current is flowing from the DC power supply to the inverter.

According to one embodiment of the present invention, there is provided an electric power steering device including the above-mentioned power conversion device.

Advantageous Effects of Invention

According to the present invention, it is possible to provide the power conversion device capable of suppressing deterioration of the accuracy of the values of phase currents acquired by the controller, and the electric power steering device including the power conversion device.

DESCRIPTION OF EMBODIMENTS

Now, a power conversion device and an electric power steering device according to preferred embodiments of the present invention are described with reference to the accompanying drawings. In the illustration of the drawings, the same components or corresponding components are denoted by the same reference symbols, and the overlapping description thereof is herein omitted.

First Embodiment

Figure 1:
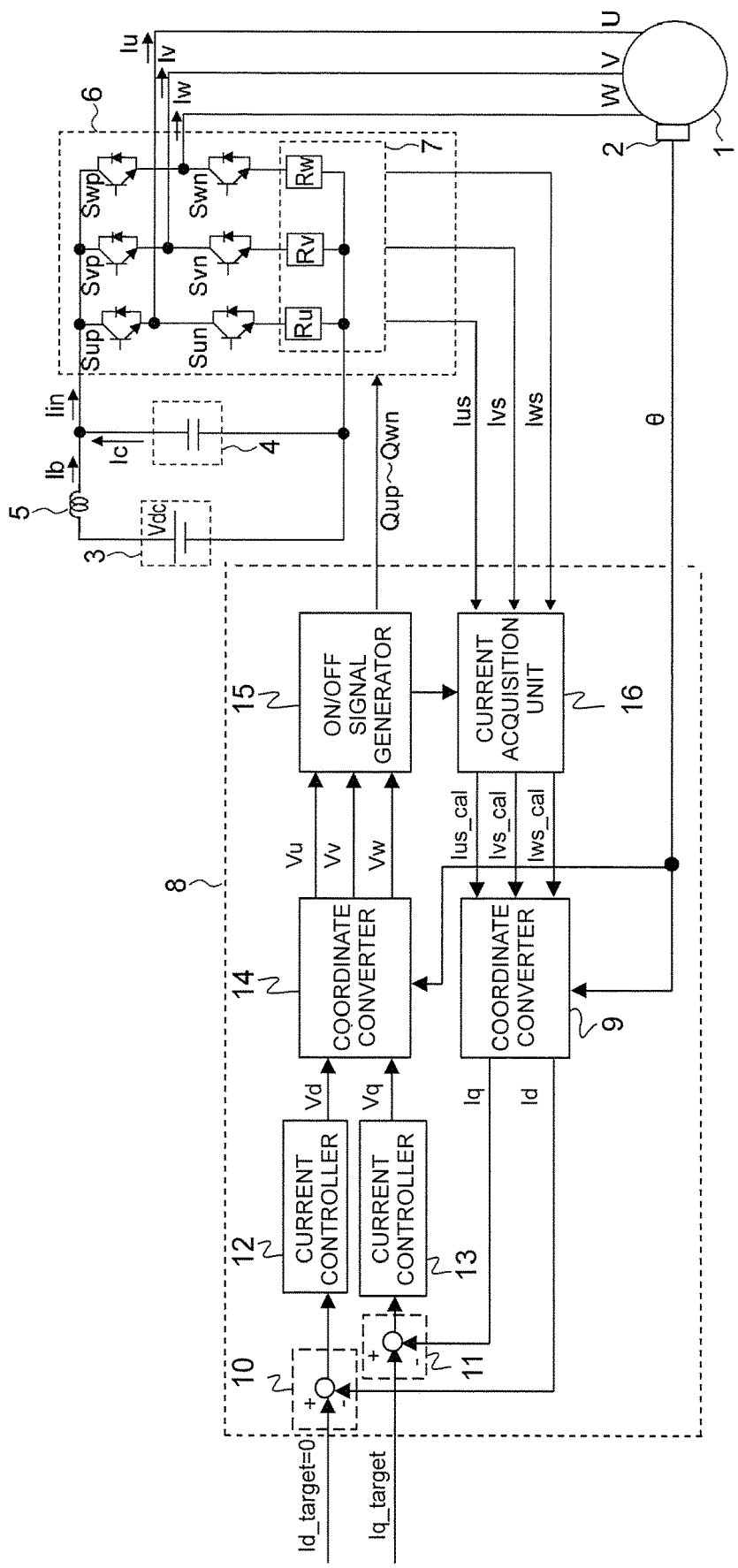
FIG. 1 is a diagram for illustrating an overall configuration of a power conversion device according to a first embodiment of the present invention.

FIG. 1 is a diagram for illustrating an overall configuration of a power conversion device according to a first embodiment of the present invention. In FIG. 1, a DC power supply 3 and an AC rotary machine 1 are also illustrated. The DC power supply 3 is connected to an input side of the power conversion device. The AC rotary machine 1 is connected to an output side of the power conversion device.

As illustrated in FIG. 1, the power conversion device according to the first embodiment includes a smoothing capacitor 4, an inverter 6, a current detector 7, and a controller 8.

The AC rotary machine 1 is a three-phase AC motor including three-phase windings formed of a winding U in a U phase, a winding V in a V phase, and a winding W in a W phase. Specific examples of the AC rotary machine 1 include a permanent-magnet synchronous motor, an induction motor, and a synchronous reluctance motor, but any type of motor may be used as the AC rotary machine 1 as long as the motor has three-phase windings. A case in which a permanent-magnet synchronous motor of non-salient type is used as the AC rotary machine 1 is exemplified herein.

A position detector 2 is provided on the AC rotary machine 1. The position detector 2 is configured to detect a rotation position θ of the AC rotary machine 1 to output the detected rotation position θ to the controller 8.

The DC power supply 3 includes a high electric potential-side terminal and a low electric potential-side terminal, and is configured to output a DC voltage Vdc to the inverter 6 as a voltage between both of the terminals. The DC power supply 3 includes any devices configured to output a DC voltage, such as a battery, a DC-DC converter, a diode rectifier, and a pulse width modulation (PWM) rectifier.

The smoothing capacitor 4 is provided in parallel between the DC power supply 3 and the inverter 6. The smoothing capacitor 4 is connected in parallel to the DC power supply 3, and is configured to suppress fluctuation of the DC voltage Vdc input to the inverter 6a, to thereby achieve a stable DC voltage. A current Ic flows through the smoothing capacitor 4.

An inductance 5 represents an inductance value contained inside the DC power supply 3 and in wires from the DC power supply 3 to the smoothing capacitor 4. In general, in the power conversion device, a common mode choke coil is connected as a noise filter to a vicinity of the DC power supply 3 so as to suppress noise flowing out from the inverter 6 to the DC power supply 3. An inductance value of such a noise filter is also contained in the inductance 5. A current Ib flows through the inductance 5.

The inverter 6 includes high electric potential-side switching elements Sup to Swp and low electric potential-side switching elements Sun to Swn provided in correspondence with the respective three phases of the U phase, the V phase, and the W phase. Specifically, the inverter 6 is a three-phase inverter formed of the high electric potential-side switching elements Sup to Swp and the low electric potential-side switching elements Sun to Swn. In the inverter 6, the respective switching elements Sup to Swn are switched on and off based on on/off signals Qup to Qwn output from the controller 8. Through switching described above, the inverter 6 inverts the DC voltage Vdc output by the DC power supply 3 to AC voltages, and outputs the AC voltages. As a result, the AC voltages are applied to the windings U to W of the AC rotary machine 1, and phase currents Iu to Iw are thus supplied to the windings U to W, respectively.

The on/off signals Qup to Qwn are the switching signals for switching on and off the switching elements Sup to Swn, respectively. In the following, it is assumed that, when the value of each of the on/off signals Qup to Qwn is "1", a signal for turning on a switching element corresponding to the on/off signal is output. It is also assumed that, when the value of the signal is "0", a signal for tuning off the element corresponding to the on/off signal is output.

As each of the switching elements Sup to Swn, a semiconductor switching device, for example, an insulated gate bipolar transistor (IGBT), a bipolar transistor, or a metal-oxide-semiconductor (MOS) power transistor and a diode connected thereto in antiparallel are used.

The current detector 7 is connected in series to the switching elements Sun to Swn on the low electric potential side of the inverter 6. The current detector 7 detects the values of the phase currents Iu to Iw in the three phases as phase current detection values Ius to Iws, respectively.

Specifically, the phase current detection value Ius is detected by detecting a voltage between both ends of a resistor Ru inside the current detector 7. Similarly, the phase current detection value Ivs is detected by detecting a voltage between both ends of a resistor Rv inside the current detector 7. Similarly, the phase current detection value Iws is detected by detecting a voltage between both ends of a resistor Rw inside the current detector 7.

Current command values Id_target and Iq_target set as control commands for controlling the AC rotary machine 1 are input to the controller 8. A case in which the current command Id_target is set to 0 is herein exemplified.

The controller 8 calculates phase voltage commands Vu to Vw in the three phases, and controls the inverter 6 in accordance with the calculated phase voltage commands Vu to Vw in the three phases. Specifically, the controller 8 outputs the on/off signals Qup to Qwn based on input current commands Id_target and Iq_target, the rotation position θ input from the position detector 2, and phase current calculation values Ius_cal to Iws_cal. A detailed description is later given of the phase current calculation values Ius_cal to Iws_cal.

A case in which the command values for the currents supplied to the AC rotary machine 1 are set as the control commands for the AC rotary machine 1 is exemplified, but the control commands are not limited thereto. For example, when the V/F control is applied to the AC rotary machine 1, the control command is a speed command value for the AC rotary machine 1. When a rotation position of the AC rotary machine 1 is controlled, the control command is a position command value for the AC rotary machine 1.

Description is now given of elements constructing the controller 8. The controller 8 includes a coordinate converter 9, a subtractor 10, a subtractor 11, a current controller 12, a current controller 13, a coordinate converter 14, an on/off signal generator 15, and a current acquisition unit 16.

The coordinate converter 9 calculates a current Id on a "d" axis and a current Iq on a "q" axis of rotating two axes, that is, on the "d" axis and the "q" axis, based on the phase current calculation values Ius_cal to Iws_cal input from the current acquisition unit 16 and the rotation position θ input from the position detector 2. The coordinate converter 9 outputs the calculated current Id to the subtractor 10, and outputs the calculated current Iq to the subtractor 11.

The subtractor 10 subtracts the current Id input from the coordinate converter 9 from the current command Id_target, and outputs a result of the subtraction to the current controller 12.

The subtractor 11 subtracts the current Iq input from the coordinate converter 9 from the current command Iq_target, and outputs a result of the subtraction to the current controller 13.

The current controller 12 applies proportional and integral control to the output value of the subtractor 10 so that the output value is zero, to thereby calculate a voltage Vd on the "d" axis on the rotating two axes to output the calculated voltage Vd to the coordinate converter 14.

The current controller 13 applies proportional and integral control to the output value of the subtractor 11 so that the output value is zero, to thereby calculate a voltage Vq on the "q" axis on the rotating two axes to output the calculated voltage Vq to the coordinate converter 14.

The coordinate converter 14 calculates the phase voltage commands Vu to Vw in the three phases based on the voltages Vd and Vq input from the current controller 12 and the current controller 13, respectively, and the rotation position θ input from the position detector 2, and outputs the results to the on/off signal generator 15.

Figure 2:
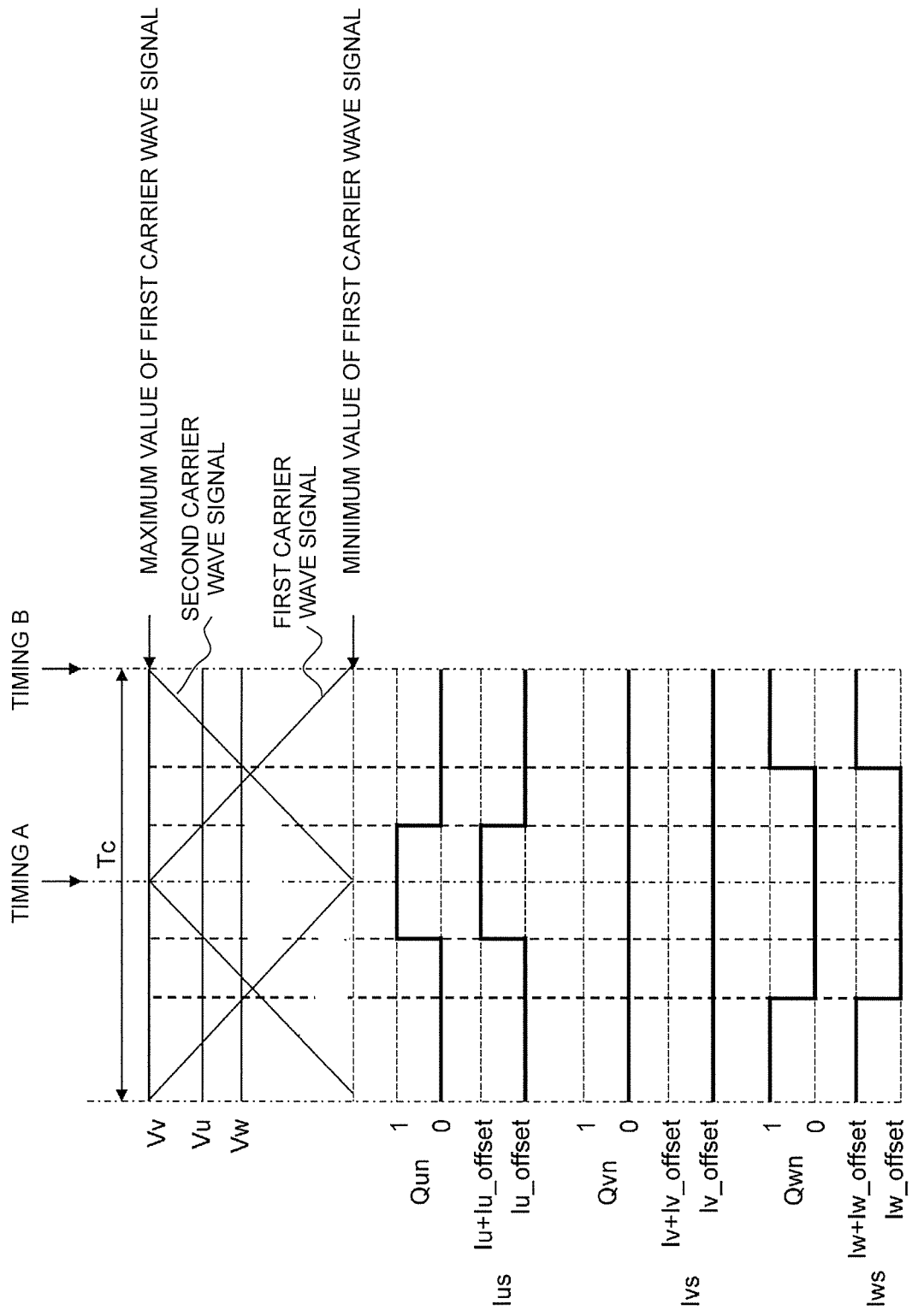
FIG. 2 is a timing chart for showing a first example of temporal changes in respective phase current detection values in a U phase, a V phase, and a W phase in the first embodiment of the present invention.

With reference to FIG. 2, description is now given of respective operations of the on/off signal generator 15 and the current acquisition unit 16. FIG. 2 is a timing chart for showing a first example of temporal changes in the respective phase current detection values Ius, Ivs, and Iws in the U phase, the V phase, and the W phase in the first embodiment of the present invention.

First, description is given of the operation of the on/off signal generator 15. As shown in FIG. 2, the on/off signal generator 15 compares the phase voltage command Vu input from the coordinate converter 14 and the first carrier wave signal to each other. The cycle of the first carrier wave signal is a cycle Tc. A maximum value of the first carrier wave signal is located at a peak of the amplitude of the first carrier wave signal. A minimum value of the first carrier wave signal is located at a valley of the amplitude of the first carrier wave signal.

The on/off signal generator 15 outputs an on/off signal Qup having a value "1" and outputs an on/off signal Qun having a value "0" when the phase voltage command Vu is determined to be larger than the first carrier wave signal as a result of the comparison.

Meanwhile, the on/off signal generator 15 outputs the on/off signal Qup having a value "0" and outputs the on/off signal Qun having a value "1" when the phase voltage command Vu is determined to be smaller than the first carrier wave signal. In FIG. 2, the waveform of the on/off signal Qun is shown. Meanwhile, there is a relationship of "Qup+Qun=1", and the waveform of the on/off signal Qup is thus omitted.

The on/off signal generator 15 compares the phase voltage command Vw input from the coordinate converter 14 and the second carrier wave signal to each other. The second carrier wave signal has the same shape as that of the first carrier wave signal, and is different from the first carrier wave signal by ½ cycle of the cycle Tc. Moreover, the second carrier wave signal has the same cycle Tc as that of the first carrier wave signal.

The on/off signal generator 15 outputs an on/off signal Qwp having a value "1" and outputs an on/off signal Qwn having a value "0" when the phase voltage command Vw is determined to be larger than the second carrier wave signal as a result of the comparison.

Meanwhile, the on/off signal generator 15 outputs the on/off signal Qwp having a value "0" and outputs the on/off signal Qwn having a value "1" when the phase voltage command Vw is determined to be smaller than the second carrier wave signal. In FIG. 2, the waveform of the on/off signal Qwn is shown. Meanwhile, there is a relationship of "Qwp+Qwn=1", and the waveform of the on/off signal Qwp is thus omitted.

The on/off signal generator 15 compares a phase voltage command Vv input from the coordinate converter 14 and one of the first carrier wave signal or the second carrier wave signal to each other. The on/off signal generator 15 outputs an on/off signal Qvp having a value "1" and outputs an on/off signal Qvn having a value "0" when the phase voltage command Vv is determined to be larger than the carrier wave signal as a result of the comparison.

As shown in FIG. 2, the phase voltage command Vv matches the maximum value of the first carrier wave signal. Thus, irrespective of which of the first carrier wave signal and the second carrier wave signal is compared to the phase voltage command Vv, the on/off signal generator 15 outputs the on/off signal Qvp having the value "1" and the on/off signal Qvn having the value "0".

As described above, there is no difference irrespective of which of the first carrier wave signal and the second carrier wave signal is compared, by the on/off signal generator 15, to the phase voltage command Vv, but, as a specific example, it is assumed that the on/off signal generator 15 compares the phase voltage command Vv and the first carrier wave signal to each other. FIG. 2 shows the waveform of the on/off signal Qvn, but there exists a relationship of "Qvp+Qvn=1", and the waveform of the on/off signal Qvp is thus omitted.

As can be understood from the description given above, the on/off signal generator 15 compares the phase voltage command in at least one phase of the phase voltage commands Vu to Vw in the three phases and the first carrier wave signal to each other, and compares the phase voltage command in the remaining phase of the phase voltage commands Vu to Vw in the three phases and the second carrier wave signal to each other. The on/off signal generator 15 controls the switching elements Sup to Swn of the inverter 6 to switch on and off in accordance with the comparison.

Description is now given of the operation of the current acquisition unit 16. The current acquisition unit 16 acquires, from the current detector 7, a first phase current detection value as a phase current detection value in a first phase being a phase corresponding to the phase voltage command to be compared to the first carrier wave signal at respective timings of a timing A and a timing B.

Further, the current acquisition unit 16 acquires, from the current detector 7, a second phase current detection value as a phase current detection value in a second phase being a phase corresponding to the phase voltage command to be compared to the second carrier wave signal at respective timings of the timing A and the timing B.

The timing A is a timing at which the phase current in the first phase flows through the resistor forming the current detector 7 and corresponding to the first phase, and is, more specifically, for example, a timing at which the low electric potential-side switching element corresponding to the first phase is turned on when the phase voltage command in the first phase is zero. Moreover, the timing B is a timing at which the phase current in the second phase flows through the resistor forming the current detector 7 and corresponding to the second phase, and is, more specifically, for example, a timing at which the low electric potential-side switching element corresponding to the second phase is turned on when the phase voltage command in the second phase is zero. The timing B is shifted with respect to the timing A by, for example, a ½ cycle of the cycle Tc.

In the first embodiment, as shown in FIG. 2, there is exemplified a case in which the phase voltage command to be compared to the first carrier wave signal is the phase voltage command Vu in the U phase and the phase voltage command to be compared to the second carrier wave signal is the phase voltage command Vw in the W phase. In this case, the first phase is the U phase, and the first phase current detection value is the phase current detection value Ius in the U phase. Moreover, the second phase is the W phase, and the second phase current detection value is the phase current detection value Iws in the W phase.

Further, in the first embodiment, as shown in FIG. 2, there is exemplified a case in which the first carrier wave signal takes the maximum value at the timing A and the first carrier wave signal takes the minimum value at the timing B.

Description is now given of a method of calculating the phase current calculation values Ius_cal to Iws_cal by the current acquisition unit 16. The phase current detection value Ius acquired by the current acquisition unit 16 from the current detector 7 at the timing A is hereinafter referred to as "phase current detection value Ius(A)" for the sake of convenience. The phase current detection value Ius acquired by the current acquisition unit 16 from the current detector 7 at the timing B is similarly referred to as "phase current detection value Ius(B)." Notations similar to those of the phase current detection value Ius are used also for the phase current detection value Ivs and the phase current detection value Iws.

First, description is given of a method of calculating the first phase current calculation value in the first phase, that is, the phase current calculation value Ius cal in the U phase. As shown in FIG. 2, the phase current detection value Ius(B) is equivalent to an offset current value Iu_offset. A reason for this is as follows.

That is, the value of the on/off signal Qun is "0" at the timing B, and the switching element Sun corresponding to the U phase is thus turned off. As a result, the phase current Iu does not flow through the resistor Ru of the current detector 7, and the phase current detection value Ius(B) is expected to be 0. However, actually, the phase current detection value Ius(B) is not 0, and the phase current detection value Ius(B) takes a value other than 0. This value can be determined as an offset caused to occur by a temperature drift of the current detector 7 and the like, that is, an offset current value Iu_offset. That is, the phase current detection value Ius(B) is equivalent to the offset current value Iu_offset.

The value of the on/off signal Qun is "1" at the timing A, and the switching element Sun corresponding to the U phase is thus turned on. As a result, the phase current Iu flows through the resistor Ru of the current detector 7, and the phase current detection value Ius(A) is to be a value other than 0. The phase current detection value Ius(A) is equal to a sum of the value of the phase current Iu and the offset current value Iu_offset.

On the basis of the above-mentioned point, the current acquisition unit 16 calculates a first phase current calculation value based on the first phase current detection values acquired at respective timings of the timing A and the timing B. That is, the current acquisition unit 16 calculates the phase current calculation value Ius cal based on the phase current detection value Ius(A) and the phase current detection value Ius(B) acquired at respective timings of the timing A and the timing B.

Specifically, the current acquisition unit 16 subtracts the offset current value equivalent to the first phase current detection value acquired at the timing B from the first phase current detection value acquired at the timing A, to thereby calculate the first phase current calculation value. That is, the current acquisition unit 16 subtracts the offset current value Iu_offset equivalent to the phase current detection value Ius(B) acquired at the timing B from the phase current detection value Ius(A) acquired at the timing A, to thereby calculate the phase current calculation value Ius cal. As described above, the two phase current detection values Ius(A) and Ius(B) acquired at the two current acquisition timings, respectively, are used to calculate the phase current calculation value Ius_cal, thereby being capable of removing influence of the offset current value Iu_offset.

There is exemplified the case in which the phase current detection value Ius(B) is directly used to calculate the phase current calculation value Ius_cal, but the calculation is not limited to this example. That is, in consideration of a point that a time constant of the temperature drift is larger than the cycle Tc, the phase current detection value Ius(B) processed through moving averaging, filtering, or the like may be used to calculate the phase current calculation value Ius_cal, in order to reduce the error caused by the noise.

The case in which the first phase is the U phase is exemplified, but even when the first phase is another phase, the above-mentioned method may similarly be applied to calculate the phase current calculation value corresponding to the first phase.

Next, description is given of a method of calculating the second phase current calculation value in the second phase, that is, the phase current calculation value Iws_cal in the W phase. As shown in FIG. 2, the phase current detection value Iws(A) is equivalent to an offset current value Iw_offset. A reason for this is as follows.

That is, the value of the on/off signal Qwn is "0" at the timing A, and the switching element Swn corresponding to the W phase is thus turned off. As a result, the phase current Iw does not flow through the resistor Rw of the current detector 7, and the phase current detection value Iws(A) is expected to be 0. However, actually, the phase current detection value Iws(A) is not 0, and the phase current detection value Iws(A) takes a value other than 0. This value can be determined as an offset caused to occur by a temperature drift of the current detector 7 and the like, that is, an offset current value Iw_offset. That is, the phase current detection value Iws(A) is equivalent to the offset current value Iw_offset.

Subsequently, the value of the on/off signal Qwn is "1" at the timing B, and the switching element Swn corresponding to the W phase is thus turned on. As a result, the phase current Iw flows through the resistor Rw of the current detector 7, and the phase current detection value Iws(B) is to be a value other than 0. The phase current detection value Iws(B) is equal to a sum of the value of the phase current Iw and the offset current value Iw_offset.

On the basis of the above-mentioned point, the current acquisition unit 16 calculates a second phase current calculation value based on the second phase current detection values acquired at respective timings of the timing A and the timing B. That is, the current acquisition unit 16 calculates the phase current calculation value Iws cal based on the phase current detection value Iws(A) and the phase current detection value Iws(B) acquired at respective timings of the timing A and the timing B.

Specifically, the current acquisition unit 16 subtracts the offset current value equivalent to the second phase current detection value acquired at the timing A from the second phase current detection value acquired at the timing B, to thereby calculate the second phase current calculation value. That is, the current acquisition unit 16 subtracts the offset current value Iw_offset equivalent to the phase current detection value Iws(A) acquired at the timing A from the phase current detection value Iws(B) acquired at the timing B, to thereby calculate the phase current calculation value Iws_cal. As a result, the phase current calculation value Iws_cal from which the influence of the offset current value Iw_offset is removed can be obtained.

The case in which the second phase is the W phase is exemplified, but even when the second phase is another phase, the above-mentioned method may similarly be applied to calculate the phase current calculation value corresponding to the second phase.

The controller 8 calculates the phase voltage commands Vu to Vw through use of the first phase current calculation value and the second phase current calculation value calculated by the above-mentioned method, that is, the phase current calculation values Ius_cal and Iws_cal.

Specifically, the controller 8 calculates the phase voltage commands Vu to Vw through use of the phase current calculation values Ius_cal and Iws_cal, and the phase current calculation value Ivs_cal calculated from the phase current calculation values Ius_cal and Iws_cal by a method described below.

The method of calculating the phase current calculation value Ivs_cal in the V phase is as follows. That is, the current acquisition unit 16 uses the fact that the sum of the phase currents Iu to Iw is 0, that is, "Iu+Iv+Iw=0", to calculate the phase current calculation value Ivs_cal. Specifically, the current acquisition unit 16 uses the phase current calculation values Ius_cal and Iws_cal to calculate the phase current calculation value Ivs_cal in accordance with the relationship of "Ivs_cal=−Ius_cal−Iws_cal".

Figure 3:
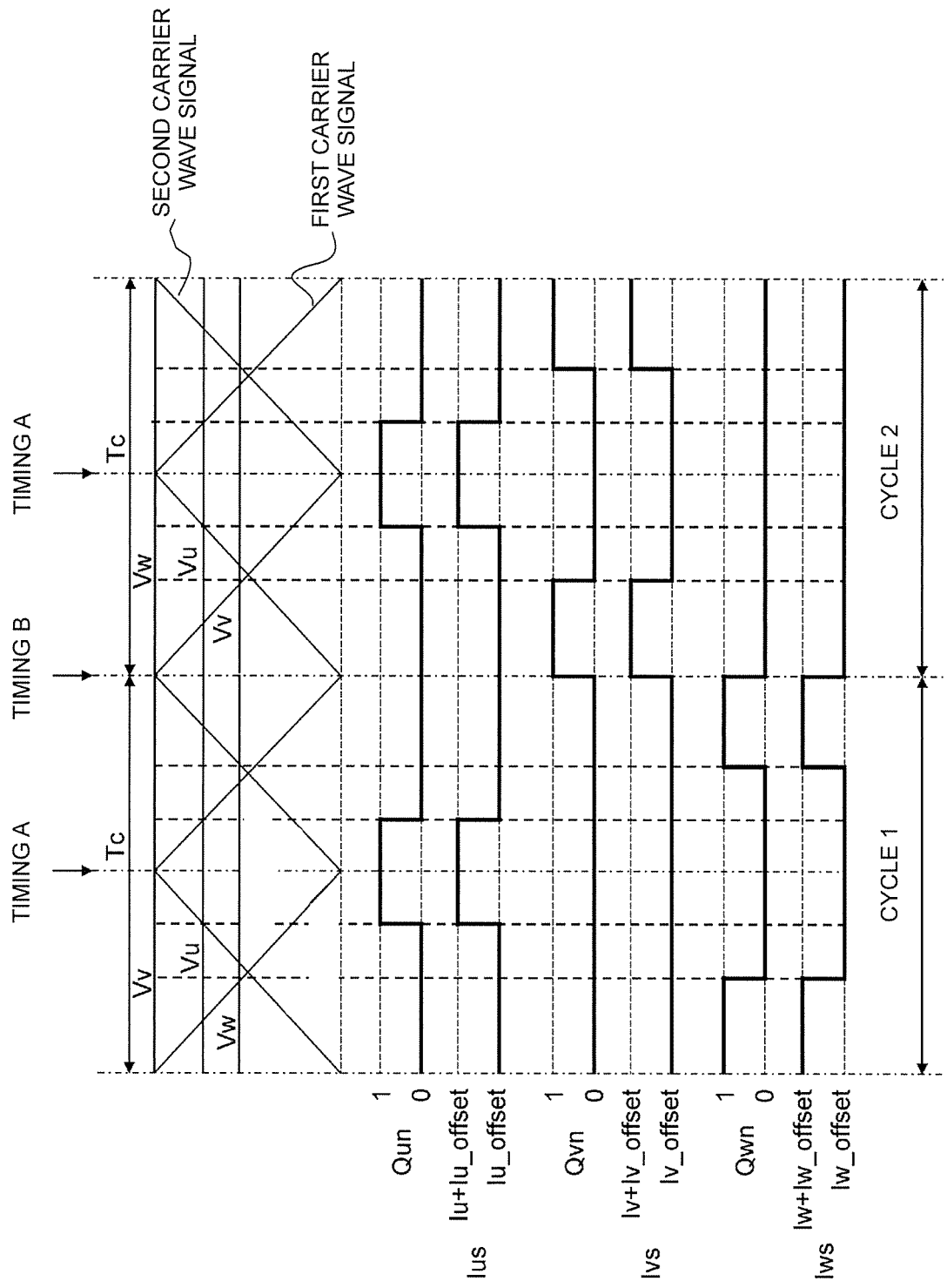
FIG. 3 is a timing chart for showing a second example of the temporal changes in the respective phase current detection values in the U phase, the V phase, and the W phase in the first embodiment of the present invention.
Figure 4:
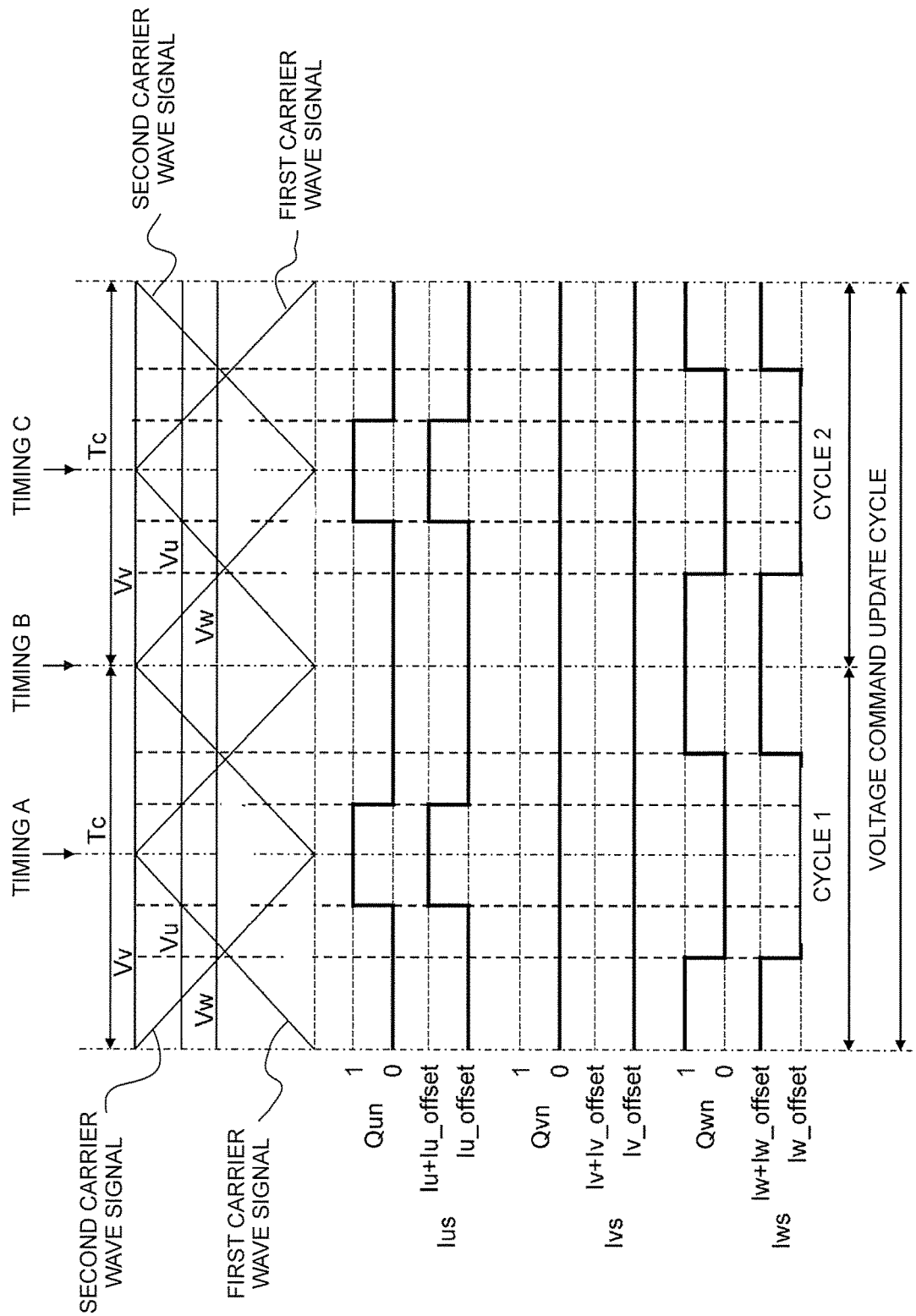
FIG. 4 is a timing chart for showing a third example of the temporal changes in the respective phase current detection values in the U phase, the V phase, and the W phase in the first embodiment of the present invention.

The controller 8 may be configured to execute the calculation of the phase voltage commands Vu to Vw in the three phases at a cycle which is a natural number multiple of the cycle Tc, the natural number being equal to or larger than 2. With reference to FIG. 3 and FIG. 4, description is now given of this configuration.

FIG. 3 is a timing chart for showing a second example of temporal changes in the respective phase current detection values Ius, Ivs, and Iws in the U phase, the V phase, and the W phase in the first embodiment of the present invention. FIG. 4 is a timing chart for showing a third example of temporal changes in the respective phase current detection values Ius, Ivs, and Iws in the U phase, the V phase, and the W phase in the first embodiment of the present invention.

As shown in FIG. 3, when the cycle 1 and the cycle 2 are compared to each other, the phase voltage command Vw in the V phase and the phase voltage command Vw in the W phase are switched in the cycle 2 with respect to the cycle 1. That is, in FIG. 3, the phase voltage commands Vu to Vw are calculated at the cycle Tc.

As shown in FIG. 3, at the timing B, the value of the on/off signal Qwn is switched from "1" to "0", and the value of the on/off signal Qvn is switched from "0" to "1". Thus, in the inverter 6, the switching elements Svp and Svn corresponding to the V phase and the switching elements Swp and Swn corresponding to the W phase perform switching.

In this case, noise components caused by the switching overlap the currents flowing through the AC rotary machine 1, and the accuracies of the phase current detection values Ius to Iws detected by the current detector 7 thus deteriorate.

To deal with this problem, as shown in FIG. 4, the cycle at which the voltage commands are calculated and updated, that is, the voltage command update cycle, is set so as to be equal to the sum of the cycle 1 and the cycle 2. As a result, the accurate current detection values can be acquired, and the accurate offset current value can be acquired at the timing B as at the timing A.

As described above, in FIG. 4, there is exemplified the case in which the phase voltage commands Vu to Vw are calculated and updated at the cycle twice as long as the cycle Tc. However, the phase voltage commands Vu to Vw may be calculated and updated at a cycle that is a natural number multiple of the cycle Tc, the natural number being equal to or larger than 3.

The current acquisition unit 16 may be configured to use an average value of the first phase current detection value acquired at the latest timing A and the first phase current detection value acquired at the previous timing A before the latest timing A when the first phase current calculation value is to be calculated. In this case, the current acquisition unit 16 is configured to subtract the offset current value from the average value, to thereby calculate the first phase current calculation value. Similarly, the current acquisition unit 16 may be configured to use an average value of the second phase current detection value acquired at the latest timing B and the second phase current detection value acquired at the previous timing B before the latest timing B when the second phase current calculation value is to be calculated. In this case, the current acquisition unit 16 is configured to subtract the offset current from the average value, to thereby calculate the second phase current calculation value.

With the above-mentioned configuration, there can be obtained the phase current calculation values having higher noise resistance. Consequently, there is provided an effect of reducing occurrence of a torque ripple, vibration, and noise of the AC rotary machine 1 caused by the noise.

As described above, according to the first embodiment, the controller 8 for the power conversion device is configured to acquire, from the current detector 7 at the timing A, the first phase current detection value in the first phase being the phase corresponding to the phase voltage command to be compared to the first carrier wave signal, and to calculate the first phase current calculation value corresponding to the first phase based on the acquisition result. Moreover, the controller 8 is configured to acquire, from the current detector 7 at the timing B, the second phase current detection value in the second phase being the phase corresponding to the phase voltage command to be compared to the second carrier wave signal, and to calculate the second phase current calculation value corresponding to the second phase based on the acquisition result.

As a result, irrespective of which of the first carrier wave signal and the second carrier wave signal is used for the comparison with the phase voltage command, the two phase current detection values acquired at the two current detection timings, respectively, can be used to acquire the phase current calculation value from which the offset current value is removed. That is, it is possible to provide a power conversion device capable of suppressing the deterioration of the accuracy of the values of the phase currents acquired by the controller 8.

When the error allowed for the current acquisition unit 16 is smaller than a temperature change or a secular change in the offset current value of the power conversion device, the calculation for the offset current value is not essential. In this case, the controller 8 is configured as follows. That is, the controller 8 is configured to acquire the first phase current detection value at the timing A from the current detector 7, and to calculate the first phase current calculation value based on the first phase current detection value acquired at the timing A. Specifically, the controller 8 sets the first phase current detection value acquired at the timing A as the first phase current calculation value. Moreover, the controller 8 is configured to acquire the second phase current detection value at the timing B from the current detector 7, and to calculate the second phase current calculation value based on the second phase current detection value acquired at the timing B. Specifically, the controller 8 acquires the second phase current detection value at the timing B from the current detector 7, and sets the second phase current detection value acquired at the timing B as the second phase current calculation value.

Second Embodiment

In a second embodiment of the present invention, description is given of a power conversion device having a configuration different from that in the first embodiment. In the second embodiment, description is omitted for the same points as those of the first embodiment, and is mainly given of points different from the first embodiment.

Figure 5:
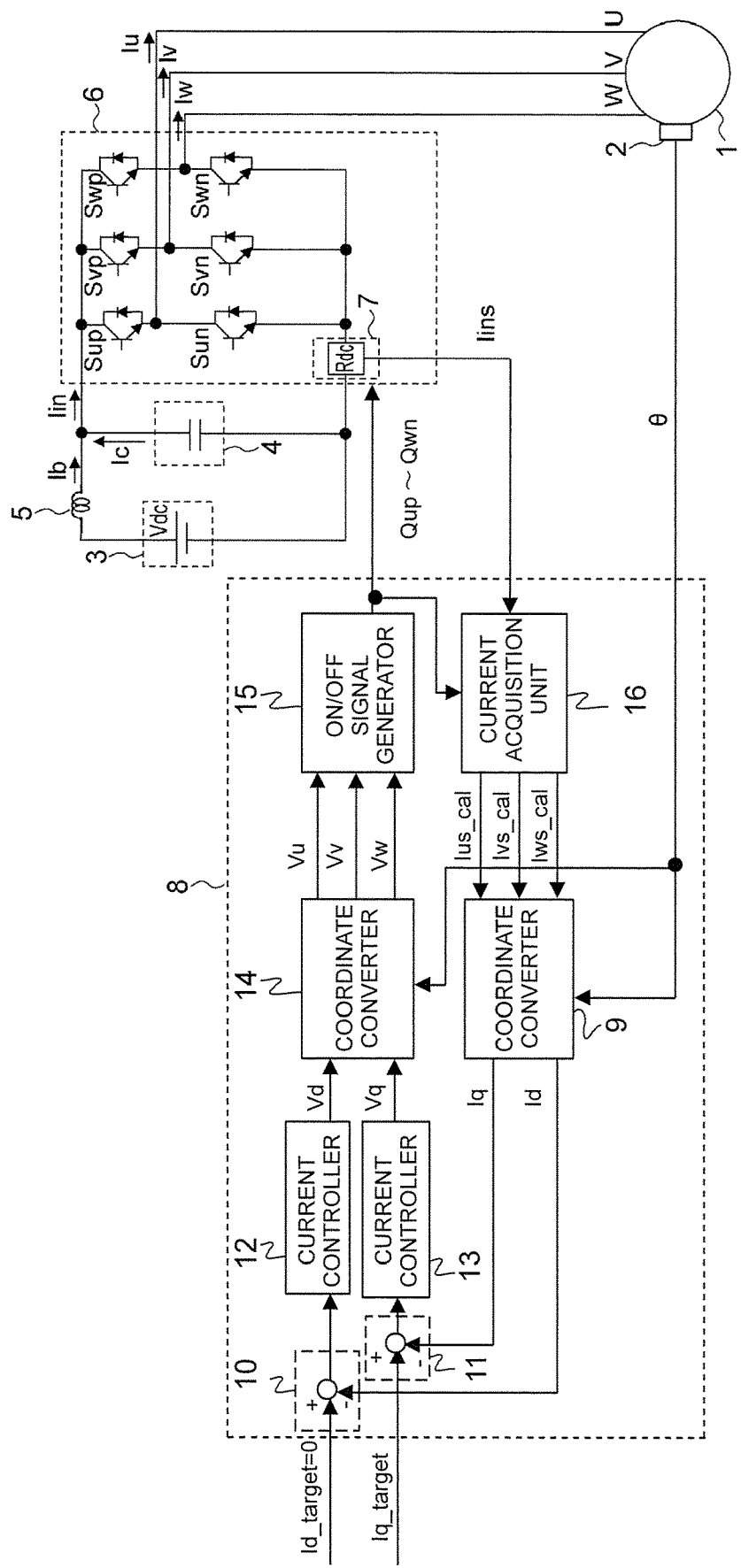
FIG. 5 is a diagram for illustrating an overall configuration of a power conversion device according to a second embodiment of the present invention.

FIG. 5 is a diagram for illustrating an overall configuration of the power conversion device according to the second embodiment of the present invention. As illustrated in FIG. 5, the power conversion device according to the second embodiment includes the smoothing capacitor 4, the inverter 6, the current detector 7, and the controller 8.

The current detector 7 has a configuration different from that in the first embodiment, and detects, as a bus current detection value Iins, the value of a bus current Iin input from the DC power supply 3 to the inverter 6. Specifically, the bus current detection value Iins is detected by detecting a voltage between both ends of a resistor Rdc inside the current detector 7. The current detector 7 outputs the detected bus current detection value Iins to the current acquisition unit 16.

Figures 6, 7:
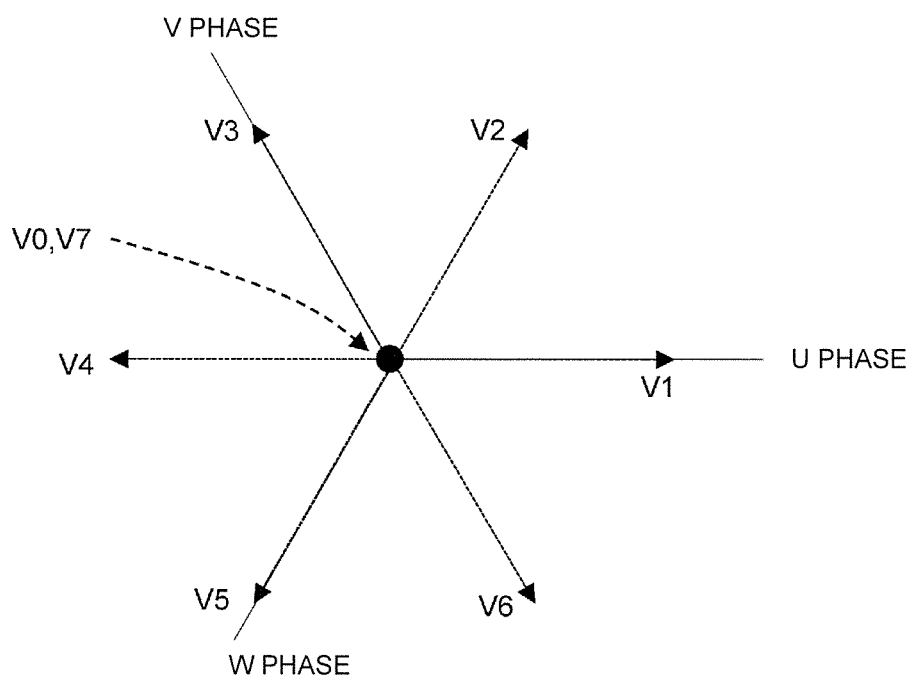
FIG. 6 is a table for showing voltage vectors output in accordance with patterns of on/off signals in the second embodiment of the present invention.
FIG. 7 is a diagram for illustrating the voltage vectors of FIG. 6.

FIG. 6 is a table for showing voltage vectors output in accordance with patterns of the on/off signals Qup to Qwn in the second embodiment of the present invention. FIG. 7 is a diagram for illustrating the voltage vectors V0 to V7 of FIG. 6.

The on/off signal generator 15 outputs the voltage vectors in accordance with the patterns of the on/off signals Qup to Qwn of FIG. 6. As shown in FIG. 6, the voltage vector is a voltage vector determined so as to correspond to the patterns of the on/off signals Qup to Qwn. The voltage vectors V0 to V7 of FIG. 6 are illustrated as in FIG. 7. As illustrated in FIG. 7, the voltage vectors V1 to V6 are effective voltage vectors having magnitudes arranged at every phase difference of 60 degrees. The voltage vectors V0 and V7 are zero-voltage vectors without a magnitude.

As shown in FIG. 6, the current acquisition unit 16 acquires a phase current calculation value equivalent to the bus current detection value Iins acquired from the current detector 7 in accordance with the patterns of the on/off signals Qup to Qwn.

For example, as shown in FIG. 6, when the pattern of the on/off signals Qup to Qwn is such a pattern that Qup=1, Qun=0, Qvp=0, Qvn=1, Qwp=0, and Qwn=1, the voltage vector V1 is output. In this case, the current acquisition unit 16 calculates the phase current calculation value Ius_cal equivalent to the bus current detection value Iins. That is, the current acquisition unit 16 determines that the bus current detection value Iins acquired at the timing at which the voltage vector V1 is output and the phase current calculation value Ius_cal are equivalent to each other. The same applies to a case in which the pattern of the on/off signals Qup to Qwn is another pattern of FIG. 6.

Figure 8:
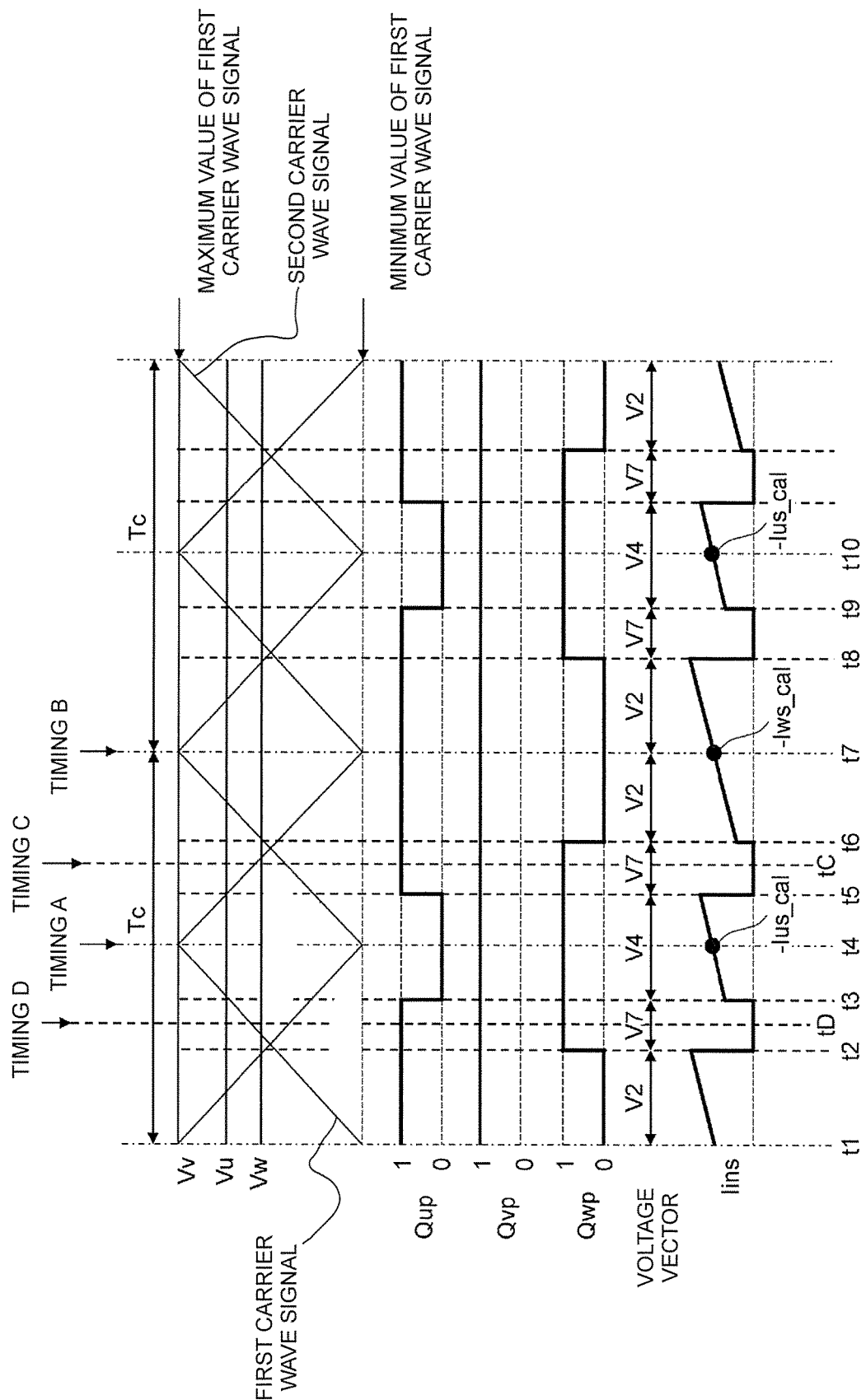
FIG. 8 is a timing chart for showing a first example of a temporal change in a bus current detection value in the second embodiment of the present invention.

With reference to FIG. 8, further description is now given of respective operations of the on/off signal generator 15 and the current acquisition unit 16. FIG. 8 is a timing chart for showing a first example of temporal changes in the bus current detection value Iins in the second embodiment of the present invention.

The phase voltage commands Vu to Vw are hereinafter set to a maximum phase voltage command, a medium phase voltage command, and a minimum phase voltage command in descending order of the magnitude of the value. In this case, in the example of FIG. 8, the phase voltage command Vv is the maximum phase voltage command, the phase voltage command Vu is the medium phase voltage command, and the phase voltage command Vw is the minimum phase voltage command.

The on/off signal generator 15 applies a first voltage shift method of equally shifting the respective phase voltage commands Vu to Vw in the three phases so that the maximum phase voltage command matches the maximum value of the first carrier wave signal. Specifically, as shown in FIG. 8, the phase voltage commands Vu to Vw are equally shifted so that the phase voltage command Vv being the maximum phase voltage command matches the maximum value of the first carrier wave signal.

As shown in FIG. 8, the on/off signal generator 15 compares the phase voltage command Vu and the first carrier wave signal to each other. The on/off signal generator 15 outputs an on/off signal Qup having a value "1" and outputs an on/off signal Qun having a value "0" when the phase voltage command Vu is determined to be larger than the first carrier wave signal as a result of the comparison.

Meanwhile, the on/off signal generator 15 outputs the on/off signal Qup having a value "0" and outputs the on/off signal Qun having a value "1" when the phase voltage command Vu is determined to be smaller than the first carrier wave signal. In FIG. 8, the waveform of the on/off signal Qup is shown. Meanwhile, there is a relationship of "Qup+Qun=1", and the waveform of the on/off signal Qun is thus omitted.

The on/off signal generator 15 compares the phase voltage command Vw and the second carrier wave signal to each other. The on/off signal generator 15 outputs an on/off signal Qwp having a value "1" and outputs an on/off signal Qwn having a value "0" when the phase voltage command Vw is determined to be larger than the second carrier wave signal as a result of the comparison.

Meanwhile, the on/off signal generator 15 outputs the on/off signal Qwp having a value "0" and outputs the on/off signal Qwn having a value "1" when the phase voltage command Vw is determined to be smaller than the second carrier wave signal. In FIG. 8, the waveform of the on/off signal Qwp is shown. Meanwhile, there is a relationship of "Qwp+Qwn=1", and the waveform of the on/off signal Qwn is thus omitted.

The on/off signal generator 15 compares the phase voltage command Vv and one of the first carrier wave signal or the second carrier wave signal to each other. The on/off signal generator 15 outputs an on/off signal Qvp having a value "1" and outputs an on/off signal Qvn having a value "0" when the phase voltage command Vv is determined to be larger than the carrier wave signal as a result of the comparison.

As shown in FIG. 8, the phase voltage command Vv matches the maximum value of the first carrier wave signal. Thus, irrespective of which of the first carrier wave signal and the second carrier wave signal is compared to the phase voltage command Vv, the on/off signal generator 15 outputs the on/off signal Qvp having the value "1" and the on/off signal Qvn having the value "0".

As described above, there is no difference irrespective of which of the first carrier wave signal and the second carrier wave signal is compared by the on/off signal generator 15 with the phase voltage command Vv, but, as a specific example, it is assumed that the on/off signal generator 15 compares the phase voltage command Vv and the first carrier wave signal to each other. FIG. 8 shows the waveform of the on/off signal Qvp, but there exists a relationship of "Qvp+Qvn=1", and the waveform of the on/off signal Qvn is thus omitted.

As can be understood from the description given above, the on/off signal generator 15 compares the phase voltage command in at least one phase of the phase voltage commands Vu to Vw in the three phases shifted by the first voltage shift method and the first carrier wave signal to each other, and compares the phase voltage command in the remaining phase of the shifted phase voltage commands Vu to Vw in the three phases and the second carrier wave signal to each other. The on/off signal generator 15 controls the respective switching elements Sup to Swn of the inverter 6 to switch on and off in accordance with the comparison.

Description is now given of the operation of the current acquisition unit 16. The current acquisition unit 16 acquires, from the current detector 7, the bus current detection value Iins at respective timings of the timing A and the timing B.

The timing A and the timing B are timings different from each other, and are timings at which the bus current Iin flows from the DC power supply 3 to the inverter 6. The timing B is shifted by, for example, ½ cycle of the cycle Tc with respect to the timing A.

In the second embodiment, as shown in FIG. 8, there is exemplified a case in which the phase voltage command to be compared to the first carrier wave signal is the phase voltage command Vu in the U phase and the phase voltage command to be compared to the second carrier wave signal is the voltage command in the W phase. In this case, a first phase which is a phase other than the phase corresponding to the maximum phase voltage command, and is a phase corresponding to the phase voltage command to be compared to the first carrier wave signal is the U phase. Further, a second phase which is a phase other than the phase corresponding to the maximum phase voltage command, and is a phase corresponding to the phase voltage command to be compared to the second carrier wave signal is the W phase.

Further, in the second embodiment, as shown in FIG. 8, there is exemplified a case in which the first carrier wave signal takes the maximum value at the timing A and the first carrier wave signal takes the minimum value at the timing B.

Description is now given of a method of calculating, by the current acquisition unit 16, the phase current calculation values Ius_cal to Iws_cal when the first voltage shift method is applied.

In FIG. 8, when a vicinity of the timing A in a period from a time t3 to a time t5 is focused on, the voltage vector V4 is output in this period. As can be understood from FIG. 6, in this case, the bus current detection value Iins is equivalent to the phase current calculation value −Ius_cal. In this period, the voltage vector V4 continues to be output, and the bus current detection value Iins thus continues to increase.

The timing A at which the current acquisition unit 16 acquires the bus current detection value Iins from the current detector 7 is set to a time t4 at the center of the period from the time t3 to the time t5. The timing A is the center of the period in which the voltage vector V4 continues to be output. With this setting, the current acquisition unit 16 can acquire an average value of the bus current detection value Iins fluctuating due to the output of the voltage vector V4.

Subsequently, in FIG. 8, when a vicinity of the timing B in a period from a time t6 to a time t8 is focused on, the voltage vector V2 is output in this period. As can be understood from FIG. 6, in this case, the bus current detection value Iins is equivalent to the phase current calculation value −Iws_cal. In this period, the voltage vector V2 continues to be output, and the bus current detection value Iins thus continues to increase.

The timing B at which the current acquisition unit 16 acquires the bus current detection value Iins from the current detector 7 is set to a time t7 at the center of the period from the time t6 to the time t8. The timing B is the center of the period in which the voltage vector V2 continues to be output. With this setting, the current acquisition unit 16 can acquire an average value of the bus current detection value Iins fluctuating due to the output of the voltage vector V2.

As described above, the current acquisition unit 16 acquires the bus current detection value Iins at respective timings of the timing A and the timing B from the current detector 7, and calculates the first phase current calculation value and the second phase current calculation value based on the bus current detection value Iins acquired at the respective timings.

Specifically, when the first voltage shift method is applied, the current acquisition unit 16 calculates the first phase current calculation value based on the bus current detection value Iins acquired at the timing A, and calculates the second phase current calculation value based on the bus current detection value Iins acquired at the timing B.

More specifically, the current acquisition unit 16 sets the bus current detection value Iins acquired at the timing A as the phase current calculation value −Ius_cal corresponding to the U phase. Moreover, the current acquisition unit 16 sets the bus current detection value Iins acquired at the timing B as the phase current calculation value −Iws_cal corresponding to the W phase. That is, the current acquisition unit 16 uses the bus current detection values Iins acquired at the timing A and the timing B, respectively, to calculate the phase current calculation values corresponding to the U phase and the V phase, respectively, other than the V phase corresponding to the maximum phase voltage command.

The current acquisition unit 16 uses the phase current calculation values −Ius_cal and −Iws_cal calculated by the above-mentioned method to calculate the phase current calculation value Ivs_cal in accordance with the relationship of "Ivs_cal=−Ius_cal−Iws_cal" as in the first embodiment.

Description is now given of a case in which an offset current value Iin_offset which is likely to be contained in the bus current detection value Iins is considered in FIG. 8.

When a zero-voltage vector, that is, the voltage vector V0 or the voltage vector V7, is output in accordance with the patterns of the on/off signals Qup to Qwn of FIG. 6, the value of the bus current detection value Iins is expected to be 0. However, the bus current detection value Iins is not actually 0, and the bus current detection value Iins takes a value other than 0. It can be determined that this value is an offset caused to occur by the temperature drift of the current detector 7 and the like, that is, the offset current value Iin_offset.

Thus, as shown in FIG. 8, there is provided a timing C which is a timing between the timing A and the timing B, and at which the bus current Iin from the DC power supply 3 to the inverter 6 is interrupted. The timing C of FIG. 8 exists in a period in which the zero-voltage vector, that is, the voltage vector V7, is output. The timing C is, for example, the center between the timing A and the timing B.

For the sake of convenience, the bus current detection values Iins acquired by the current acquisition unit 16 at the timings A, B, C, and D are hereafter referred to as bus current detection values Iins(A), Iins(B), Iins(C), and Iins (D), respectively.

The current acquisition unit 16 further acquires the bus current detection value Iins from the current detector 7 at a time tC, that is, the timing C, in the period from the time t5 to the time t6. This bus current detection value Iins(C) is equal to the offset current value Iin_offset.

The current acquisition unit 16 calculates a value obtained by subtracting the bus current detection value Iins(C) from the bus current detection value Iins(A) as the phase current calculation value −Ius_cal in the U phase. Moreover, the current acquisition unit 16 calculates a value obtained by subtracting the bus current detection value Iins(C) from the bus current detection value Iins(B) as the phase current calculation value −Iws_cal in the W phase. As a result, influence of the offset current value Iin_offset can be removed, and the accurate phase current calculation values can consequently be calculated.

As described above, the current acquisition unit 16 calculates the first phase current calculation value and the second phase current calculation value based on the bus current detection value Iins(A) acquired at the timing A, the bus current detection value Iins(B) acquired at the timing B, and the offset current value Iin_offset equivalent to the bus current detection value Iins(C) acquired at the timing C.

The current acquisition unit 16 may be configured to further acquire the bus current detection value Iins at the timing D as shown in FIG. 8. The timing D is a timing at which the bus current Iin from the DC power supply 3 to the inverter 6 is interrupted. The timing A exists between the timing D and the timing C. For example, the center of a period from the timing D to the timing C is the timing A.

In the above-mentioned case, the current acquisition unit 16 calculates the offset current value Iin offset equivalent to an average value of the bus current detection value Iins(C) acquired at the timing C and the bus current detection value Iins(D) acquired at the timing D. The current acquisition unit 16 calculates the first phase current calculation value and the second phase current calculation value based on the bus current detection value Iins(A) acquired at the timing A, the bus current detection value Iins(B) acquired at the timing B, and the offset current value Iin_offset. As a result, more accurate phase current calculation values can be calculated.

In the second embodiment, there is exemplified the case in which the first voltage shift method of FIG. 8 is applied, but the method is not limited to this example, and the following method may be applied. That is, the on/off signal generator 15 applies a second voltage shift method of equally shifting the respective phase voltage commands Vu to Vw in the three phases so that the minimum phase voltage command matches the minimum value of the first carrier wave signal. Specifically, as shown in FIG. 9, the phase voltage commands Vu to Vw are equally shifted so that the phase voltage command Vw being the minimum phase voltage command matches the minimum value of the first carrier wave signal.

Figure 9:
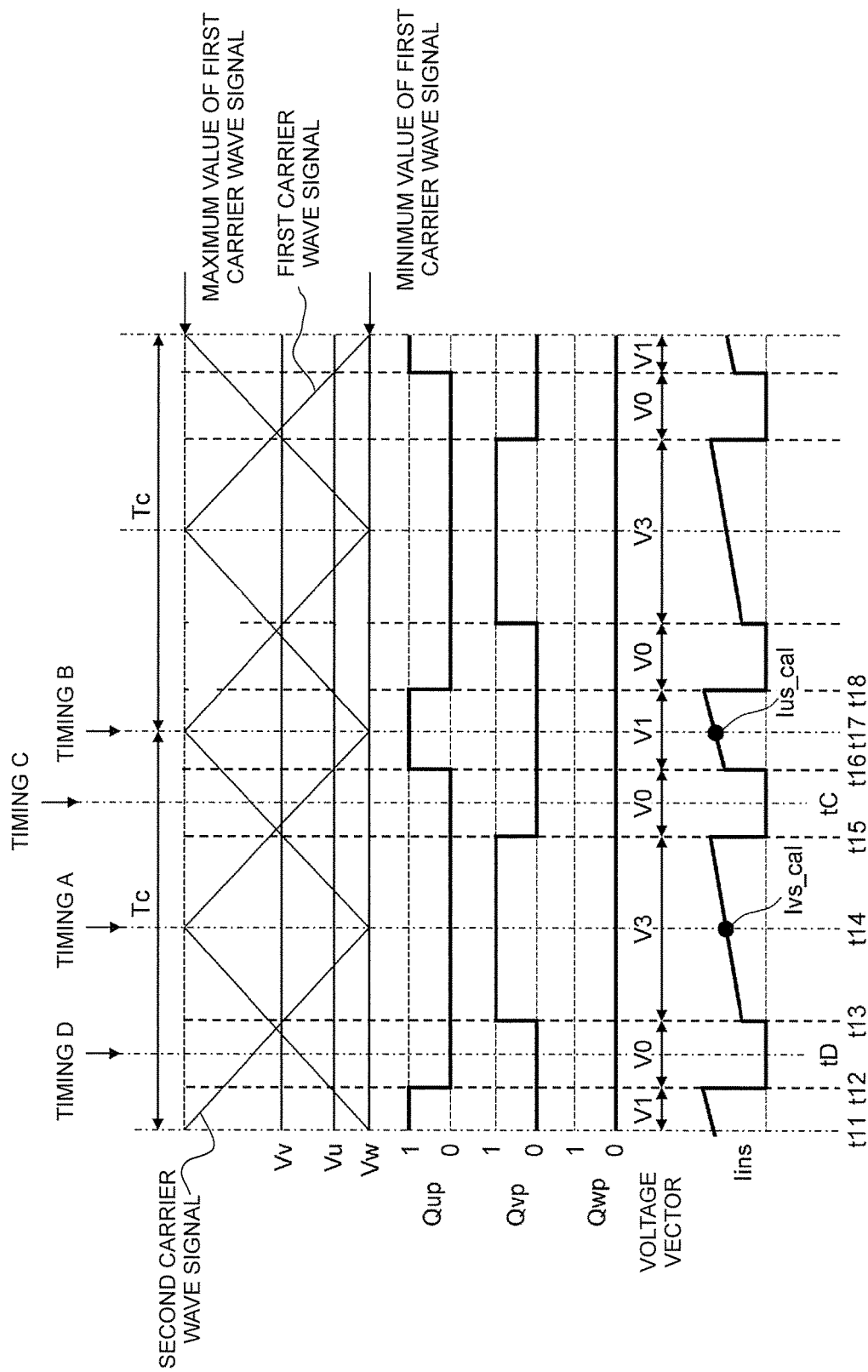
FIG. 9 is a timing chart for showing a second example of the temporal change in the bus current detection value in the second embodiment of the present invention.

FIG. 9 is a timing chart for showing a second example of temporal changes in the bus current detection value Iins in the second embodiment of the present invention.

As shown in FIG. 9, the on/off signal generator 15 compares the phase voltage command Vu and the first carrier wave signal to each other. The on/off signal generator 15 outputs an on/off signal Qup having a value "1" and outputs an on/off signal Qun having a value "0" when the phase voltage command Vu is determined to be larger than the first carrier wave signal as a result of the comparison.

Meanwhile, the on/off signal generator 15 outputs the on/off signal Qup having a value "0" and outputs the on/off signal Qun having a value "1" when the phase voltage command Vu is determined to be smaller than the first carrier wave signal. In FIG. 9, the waveform of the on/off signal Qup is shown. Meanwhile, there is a relationship of "Qup+Qun=1", and the waveform of the on/off signal Qun is thus omitted.

The on/off signal generator 15 compares the phase voltage command Vv and the second carrier wave signal to each other. The on/off signal generator 15 outputs an on/off signal Qvp having a value "1" and outputs an on/off signal Qvn having a value "0" when the phase voltage command Vv is determined to be larger than the second carrier wave signal as a result of the comparison.

Meanwhile, the on/off signal generator 15 outputs the on/off signal Qvp having a value "0" and outputs the on/off signal Qvn having a value "1" when the phase voltage command Vv is determined to be smaller than the second carrier wave signal. In FIG. 9, the waveform of the on/off signal Qvp is shown. Meanwhile, there is a relationship of "Qvp+Qvn=1", and the waveform of the on/off signal Qvn is thus omitted.

The on/off signal generator 15 compares the phase voltage command Vw and one of the first carrier wave signal or the second carrier wave signal to each other. The on/off signal generator 15 outputs an on/off signal Qwp having a value "0" and outputs an on/off signal Qwn having a value "1" when the phase voltage command Vw is determined to be smaller than the carrier wave signal as a result of the comparison.

As shown in FIG. 9, the phase voltage command Vw matches the minimum value of the first carrier wave signal. Thus, irrespective of which of the first carrier wave signal and the second carrier wave signal is compared to the phase voltage command Vw, the on/off signal generator 15 outputs the on/off signal Qwp having the value "0" and the on/off signal Qwn having the value "1".

As described above, there is no difference irrespective of which of the first carrier wave signal and the second carrier wave signal is compared by the on/off signal generator 15 with the phase voltage command Vw, but, as a specific example, it is assumed that the on/off signal generator 15 compares the phase voltage command Vw and the first carrier wave signal to each other. FIG. 9 shows the waveform of the on/off signal Qwp, but there exists a relationship of "Qwp+Qwn=1", and the waveform of the on/off signal Qwn is thus omitted.

Description is now given of a method of calculating, by the current acquisition unit 16, the phase current calculation values Ius_cal to Iws_cal when the second voltage shift method is applied.

In FIG. 9, when a vicinity of the timing A in a period from a time t13 to a time t15 is focused on, the voltage vector V3 is output in this period. As can be understood from FIG. 6, in this case, the bus current detection value Iins is equivalent to the phase current calculation value Ivs_cal. In this period, the voltage vector V3 continues to be output, and the bus current detection value Iins thus continues to increase.

The timing A at which the current acquisition unit 16 acquires the bus current detection value Iins from the current detector 7 is set to a time t14 at the center of the period from the time t13 to the time t15. The timing A is the center of the period in which the voltage vector V3 continues to be output. With this setting, the current acquisition unit 16 can acquire an average value of the bus current detection value Iins fluctuating due to the output of the voltage vector V3.

Subsequently, in FIG. 9, when a vicinity of the timing B in a period from a time t16 to a time t18 is focused on, the voltage vector V1 is output in this period. As can be understood from FIG. 6, in this case, the bus current detection value Iins is equivalent to the phase current calculation value Ius cal. In this period, the voltage vector V1 continues to be output, and the bus current detection value Iins thus continues to increase.

The timing B at which the current acquisition unit 16 acquires the bus current detection value Iins from the current detector 7 is set to a time t17 at the center of the period from the time t16 to the time t18. The timing B is the center of the period in which the voltage vector V1 continues to be output. With this setting, the current acquisition unit 16 can acquire an average value of the bus current detection value Iins fluctuating due to the output of the voltage vector V1.

As described above, the current acquisition unit 16 acquires the bus current detection value Iins at respective timings of the timing A and the timing B from the current detector 7, and calculates the first phase current calculation value and the second phase current calculation value based on the bus current detection value Iins acquired at the respective timings.

Specifically, when the second voltage shift method is applied, the current acquisition unit 16 calculates the second phase current calculation value based on the bus current detection value Iins acquired at the timing A, and calculates the first phase current calculation value based on the bus current detection value Iins acquired at the timing B.

More specifically, the current acquisition unit 16 sets the bus current detection value Iins acquired at the timing A as the phase current calculation value Ivs_cal corresponding to the V phase. Moreover, the current acquisition unit 16 sets the bus current detection value Iins acquired at the timing B as the phase current calculation value Ius_cal corresponding to the U phase. That is, the current acquisition unit 16 uses the bus current detection values Iins acquired at the timing A and the timing B, respectively, to calculate the phase current calculation values corresponding to the U phase and the V phase, respectively, other than the W phase corresponding to the minimum phase voltage command.

The current acquisition unit 16 uses the phase current calculation values Ius_cal and Ivs_cal calculated by the above-mentioned method to calculate the phase current calculation value Iws_cal in accordance with the relationship of "Iws_cal=−Ius_cal−Ivs_cal" as in the first embodiment.

Description is now given of a case in which an offset current value Iin_offset which is likely to be contained in the bus current detection value Iins is considered in FIG. 9.

As shown in FIG. 9, there is provided a timing C which is a timing between the timing A and the timing B, and at which the bus current Iin from the DC power supply 3 to the inverter 6 is interrupted. The timing C of FIG. 9 exists in a period in which the zero-voltage vector, that is, the voltage vector V0, is output. The timing C is, for example, the center between the timing A and the timing B.

The current acquisition unit 16 further acquires the bus current detection value Iins from the current detector 7 at a time tC, that is, the timing C, in the period from the time t15 to the time t16. This bus current detection value Iins(C) is equal to the offset current value Iin_offset.

The current acquisition unit 16 calculates a value obtained by subtracting the bus current detection value Iins(C) from the bus current detection value Iins(A) as the phase current calculation value Ivs_cal in the V phase. Moreover, the current acquisition unit 16 calculates a value obtained by subtracting the bus current detection value Iins(C) from the bus current detection value Iins(B) as the phase current calculation value Ius_cal in the U phase. As a result, influence of the offset current value Iin_offset can be removed, and the accurate phase current calculation values can consequently be calculated.

The current acquisition unit 16 may be configured to further acquire the bus current detection value Iins at the timing D similarly to the case of FIG. 8. In this case, the current acquisition unit 16 calculates the offset current value Iin offset equivalent to the average value of the bus current detection value Iins(C) acquired at the timing C and the bus current detection value Iins(D) acquired at the timing D. The current acquisition unit 16 calculates the first phase current calculation value and the second phase current calculation value based on the bus current detection value Iins(A) acquired at the timing A, the bus current detection value Iins(B) acquired at the timing B, and the offset current value Iin_offset.

It is preferred that the timing C be set to the center between the timing A and the timing B. Description is now given of a reason therefor.

As the amplitudes of the phase voltage commands Vu to Vw increase, an interval between a time t15 and a time t16 becomes narrower, and the acquisition of the bus current detection value Iins(C) equal to the offset current value Iin_offset thus becomes difficult. To deal with this problem, the timing C is set to the center between the timing A and the timing B, thereby being capable of acquiring the bus current detection value Iins(C) even in a range in which the amplitudes of the phase voltage commands Vu to Vw are larger.

The timing C may be later by ½ of a period required for the current acquisition unit 16 to acquire the bus current detection value Iins with respect to the center of the period from the timing A to the timing B. Specifically, the timing C may be set so as to be delayed by a half of a sum of a ringing settling period, a sample-and-hold period, and an analog/digital conversion period with respect to the center of the period from the timing A to the timing B. As a result, the error contained in the bus current detection value Iins(C) can be removed even in the range in which the amplitudes of the phase voltage commands Vu to Vw are larger.

In this configuration, when the amplitudes of the phase voltage commands Vu to Vw increase, and the interval between the time t15 and the time t16 becomes narrower than a period required to acquire the bus current detection value Iins(C), the bus current detection value Iins(C) cannot be acquired. In this case, the offset current value Iin_offset is not calculated, thereby being capable of maintaining the accuracy of the offset current value Iin_offset.

Figures 10, 11:
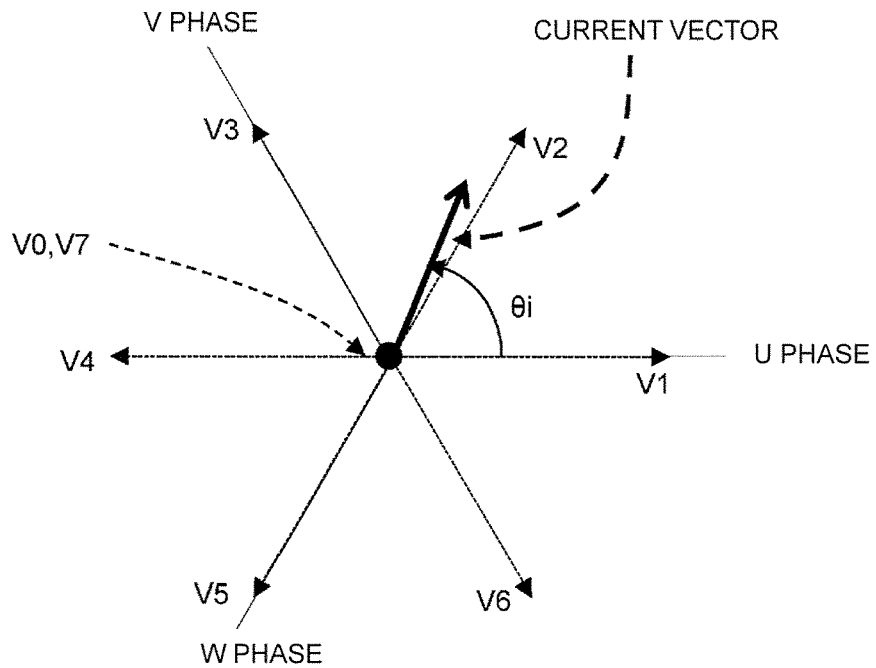
FIG. 10 is a diagram for illustrating a current vector in the second embodiment of the present invention.
FIG. 11 is a table for showing voltage shift methods selected in accordance with a current phase of the current vector in the second embodiment of the present invention.

As described above, the on/off signal generator 15 is configured to apply the first voltage shift method of FIG. 8 or the second voltage shift method of FIG. 9. With reference to FIG. 10 and FIG. 11, description is now given of an example of which of the first voltage shift method and the second voltage shift method is selected by the on/off signal generator 15.

FIG. 10 is a diagram for illustrating a current vector in the second embodiment of the present invention. FIG. 11 is a table for showing the voltage shift methods selected in accordance with the current phase θi of the current vector in the second embodiment of the present invention.

First, the on/off signal generator 15 uses the phase current calculation values Ius_cal to Iws_cal calculated by the current acquisition unit 16 to calculate the current phase θi as given by Expression (2-1).

$$\theta i = \operatorname{atan}\{(0.866 \times Ivs\_cal - 0.866 \times Iws\_cal) / \qquad (2-1)$$
$$(Ius\_cal - 0.5 \times Ivs\_cal - 0.5 \times Iws\_cal)\} \; [deg]$$

As illustrated in FIG. 10, the current phase θi calculated as given by Expression (2-1) is the phase of the current vector rotating on the U axis, the V axis, and the W axis.

As shown in FIG. 11, the on/off signal generator 15 selects one of the first voltage shift method or the second voltage shift method in accordance with a range of the calculated current phase θi. As can be understood from FIG. 11, for example, the on/off signal generator 15 selects the second voltage shift method when the calculated current phase θi is in a range equal to or larger than 30 [deg] and smaller than 90 [deg].

As described above, the on/off signal generator 15 selects the voltage shift method in accordance with the current phase θi. Thus, vectors which are of the voltage vectors V1 to V6 other than the voltage vectors V0 and V7 being zero-voltage vectors, and are the second closest voltage vector and the third closest vector to the current vector of FIG. 10 are output. As a result, even when a power factor is low, the current Ic flowing through the smoothing capacitor 4 can be reduced.

As described above, according to the second embodiment, the controller 8 of the power conversion device is configured to apply the first voltage shift method or the second voltage shift method, to thereby control the respective switching elements Sup to Swn of the inverter to switch on and off. Moreover, the controller 8 is configured to acquire the bus current detection values from the current detector 7 at respective timings of the timing A and the timing B, and to calculate the first phase current detection value and the second phase current detection value based on the acquisition results.

As a result, even when one of the first carrier wave signal or the second carrier wave signal is used for the comparison with the phase voltage command, the two bus current detection values acquired at the two current detection timings, respectively, can be used to acquire the phase current calculation value. That is, it is possible to provide a power conversion device capable of suppressing the deterioration of the accuracy of the values of the phase currents acquired by the controller 8.

Moreover, in the related art, as described in Tables 1 and 3 on p. 70 of Non-patent literature 1, in a motor drive system for calculating three-phase currents from a bus current, it is impossible to acquire the average value of the ripple components of the carrier wave signals contained in phase currents in the three phases. In contrast, according to the second embodiment, it is possible to provide the current acquisition timing at the center of each period in which the effective voltage vector continues to be output, to thereby acquire the average value of the ripple components of the carrier wave signals contained in the phase currents in the three phases. As a result, the accuracy of the values of the phase currents acquired by the controller 8 of the power conversion device increases. Further, the current Ic flowing through the smoothing capacitor 4 can be reduced, thereby contributing to downsizing of the power conversion device.

Third Embodiment

In a third embodiment of the present invention, description is given of a power conversion device configured to estimate a rotation position θ of the AC rotary machine 1 connected to an output side of the inverter 6 compared to the respective configurations in the first and second embodiments. In the third embodiment, description is omitted for the same points as those of the first and second embodiments, and is mainly given of points different from the first and second embodiments.

Figure 12:
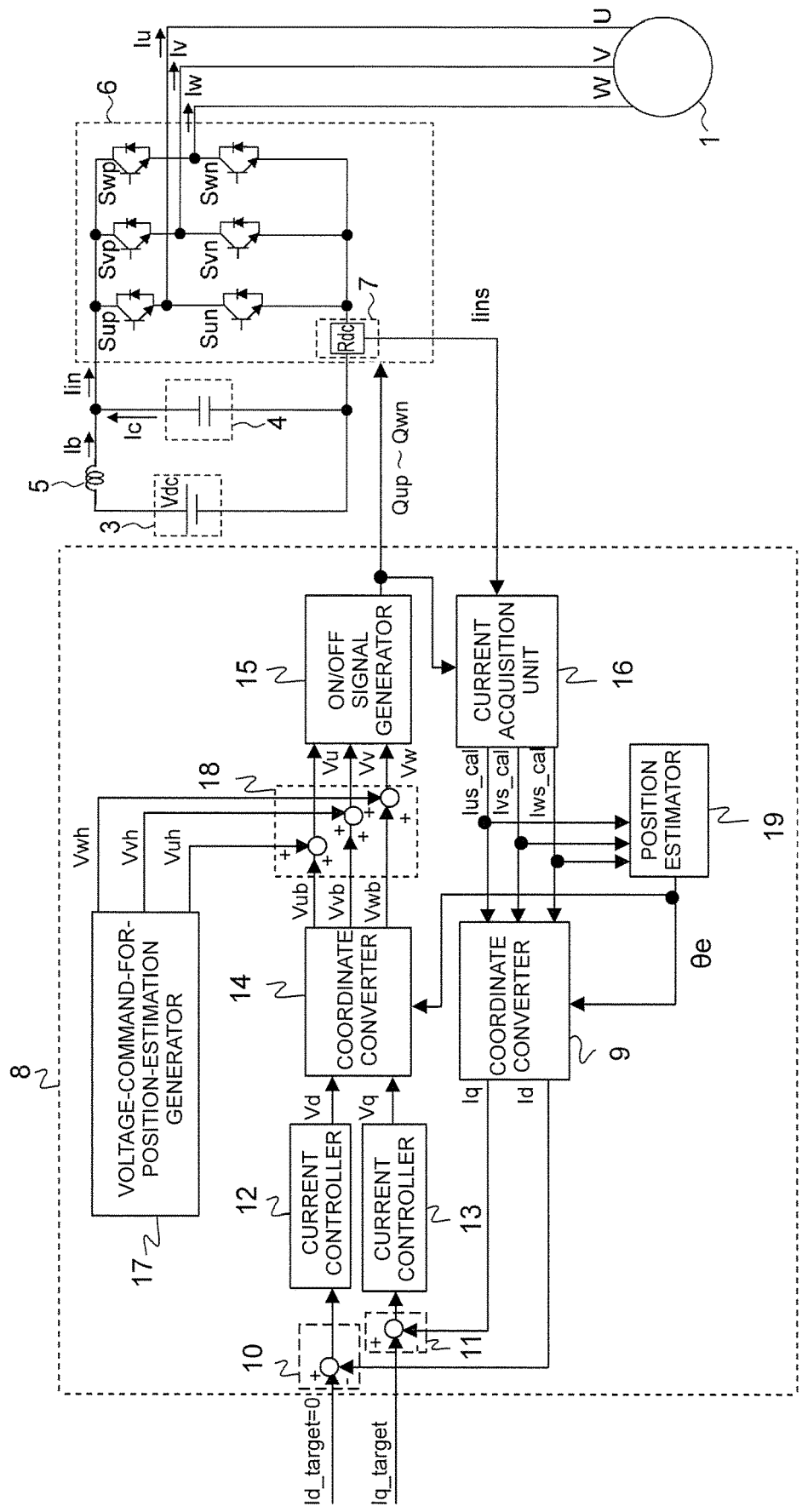
FIG. 12 is a diagram for illustrating an overall configuration of a power conversion device according to a third embodiment of the present invention.

FIG. 12 is a diagram for illustrating an overall configuration of a power conversion device according to the third embodiment of the present invention. As illustrated in FIG. 12, the power conversion device according to the third embodiment includes the smoothing capacitor 4, the inverter 6, the current detector 7, and the controller 8.

The position detector 2 is not provided on the AC rotary machine 1, which is different from the second embodiment. The current detector 7 has the same configuration as that in the second embodiment, and detects the value of the bus current Iin input to the inverter 6 as the bus current detection value Iins.

The controller 8 is different in configuration from that in the second embodiment. The controller 8 includes the coordinate converter 9, the subtractor 10, the subtractor 11, the current controller 12, the current controller 13, the coordinate converter 14, the on/off signal generator 15, the current acquisition unit 16, a voltage-command-for-position-estimation generator 17, an adder 18, and a position estimator 19.

The coordinate converter 9 calculates the currents Id and Iq on the rotating two axes based on the phase current calculation values Ius_cal to Iws_cal input from the current acquisition unit 16 and an estimated rotation position θe input from the position estimator 19.

The coordinate converter 14 calculates voltage commands for driving Vub to Vwb for driving the AC rotary machine 1 based on the voltages Vd and Vq on the rotating two axes and the estimated rotation position θe input from the position estimator 19.

The voltage-command-for-position-estimation generator 17 outputs voltage commands for position estimation Vuh to Vwh higher in frequency than the voltage commands for driving Vub to Vwb output by the coordinate converter 14. The adder 18 adds the voltage commands for driving Vub to Vwb input from the coordinate converter 14 and the voltage commands for position estimation Vuh to Vwh input from the voltage-command-for-position-estimation generator 17 to each other, respectively, to thereby calculate the phase voltage commands Vu to Vw. The phase voltage commands Vu to Vw output by the adder 18 satisfy the following relationships.

$$Vu=Vub+Vuh$$

$$Vv=Vvb+Vvh$$

$$Vw=Vwb+Vwh$$

As described above, the on/off signal generator 15 controls the inverter 6 in accordance with the phase voltage commands Vu to Vw in the three phases superimposed with the voltage commands for position estimation Vuh to Vwh, respectively.

Figure 13:
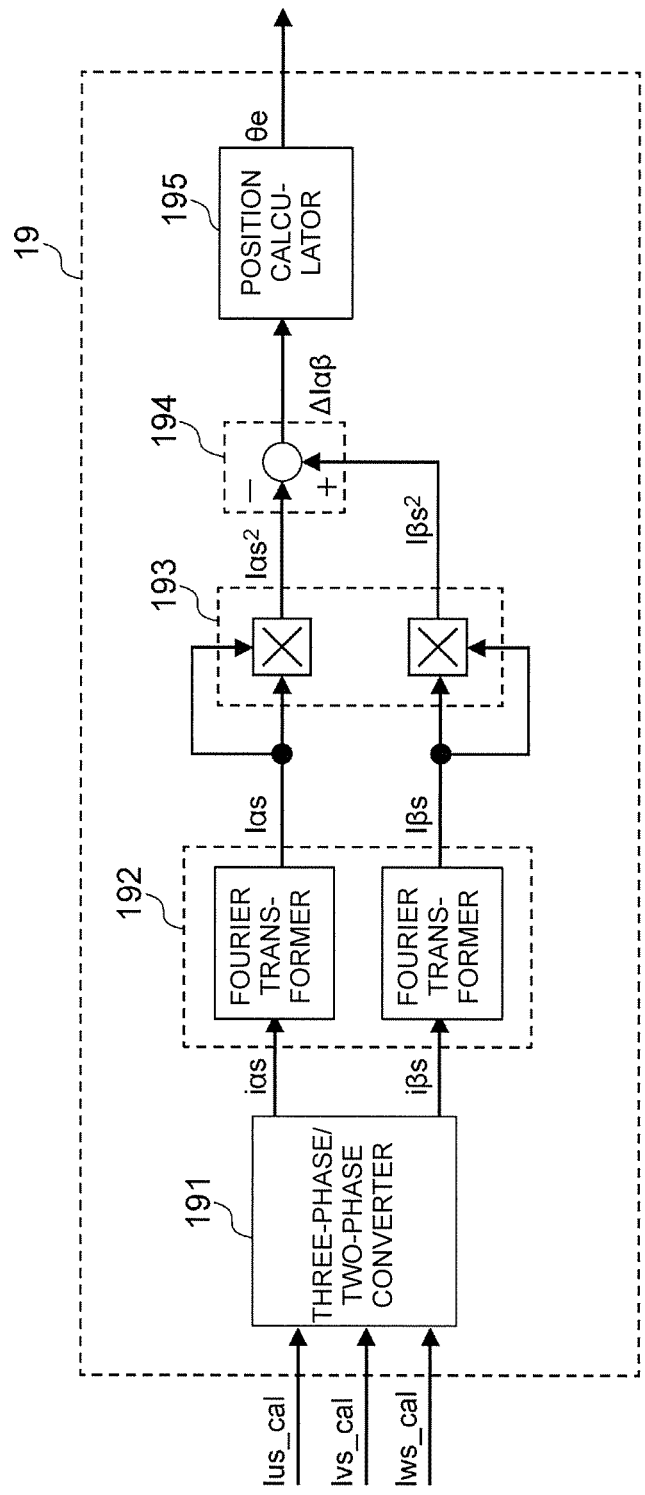
FIG. 13 is a diagram for illustrating a configuration of a position estimator in the third embodiment of the present invention.

The position estimator 19 estimates the rotation position θ of the AC rotary machine 1 connected to the output side of the inverter 6 based on the first phase current calculation value and the second phase current calculation value calculated by the current acquisition unit 16. The position estimator 19 outputs the rotation position θ which has been estimated as the estimated rotation position θe. With reference to FIG. 13, a detailed description is now given of the position estimator 19. FIG. 13 is a diagram for illustrating a configuration of the position estimator 19 in the third embodiment of the present invention. As illustrated in FIG. 13, the position estimator 19 includes a three-phase/two-phase converter 191, a Fourier transformer 192, a multiplier 193, a subtractor 194, and a position calculator 195.

The three-phase/two-phase converter 191 converts the phase current calculation values Ius_cal to Iws_cal input from the current acquisition unit 16 to currents iαs and iβs on fixed Cartesian coordinates, that is, an "α" axis and a "β" axis.

The Fourier transformer 192 extracts respective high-frequency components from the currents iαs and iβs input from the three-phase/two-phase converter 191, and obtains amplitudes Iαs and Iβs of the respective extracted high-frequency components. The high-frequency components are caused to occur by the voltage commands for position estimation Vuh to Vwh.

The multiplier 193 squares the amplitudes Iαs and Iβs input from the Fourier transformer 192 to thereby calculate amplitude square values Iαs² and Iβs², respectively, and outputs the calculation results to the subtractor 194.

The subtractor 194 subtracts the amplitude square value Iαs² from the amplitude square value Iβs² to calculate a difference value ΔIαβ, and outputs the calculation result to the position calculator 195.

The position calculator 195 calculates the estimated rotation position θe based on the difference value ΔIαβ input from the subtractor 194, and outputs the calculation result.

Description is now given of an example of a method of calculating the estimated rotation position θe by the position calculator 195. For example, when the AC rotary machine 1 is a permanent magnet synchronous motor, a voltage equation in the fixed Cartesian coordinates can be given by Expression (3-1).

$$\begin{bmatrix} V\alpha s \\ V\beta s \end{bmatrix} = \begin{bmatrix} R + PL\alpha & PL\alpha\beta \\ PL\alpha\beta & R + PL\beta \end{bmatrix} \begin{bmatrix} i\alpha s \\ i\beta s \end{bmatrix} + \omega\phi \begin{bmatrix} -\sin\theta \\ \cos\theta \end{bmatrix} \quad (3\text{-}1)$$

where:

$[V\alpha s\ V\beta s]^T$:

voltages in fixed Cartesian coordinates $[i\alpha s\ i\beta s]^T$:

currents in fixed Cartesian coordinates (two-phase currents)
R: stator resistance
P: differential operator
Ld: d-axis inductance
Lq: q-axis inductance
ω: rotational angular velocity (electrical angle)
θ: rotation position (phase difference between U axis (FIG. 7) and magnetic pole)

$$\begin{cases} L = (Ld + Lq)/2 \\ 1 = (Ld - Lq)/2 \end{cases}$$

$$\begin{cases} L\alpha = L + 1\cos2\theta \\ L\beta = L - 1\cos2\theta \\ L\alpha\beta = 1\sin2\theta \end{cases}$$

It is assumed that the AC rotary machine 1 is stopped or is operating at a low speed, and ω is thus considered to be 0. In this case, when the differential operator P is replaced by the Laplacian operator "s", the currents iαs and iβs in the fixed Cartesian coordinates can be given by Expression (3-2).

$$\begin{bmatrix} i\alpha s \\ i\beta s \end{bmatrix} = \begin{bmatrix} R + sL\alpha & sL\alpha\beta \\ sL\alpha\beta & R + L\beta \end{bmatrix}^{-1} \begin{bmatrix} v\alpha s \\ v\beta s \end{bmatrix} \quad (3\text{-}2)$$

When the voltage commands for position estimation Vuh to Vwh are superimposed on the voltage commands for driving Vub to Vwb, respectively, there are satisfied relationships of "R<<Lα·ωh" and "R<<Lβ·ωh". The angular frequency ωh of the voltage commands for position estimation Vuh to Vwh is sufficiently higher than the angular frequency of the voltage commands for driving Vub to Vwb. Moreover, "s" is jωh. The symbol "j" represents the imaginary unit.

In the above-mentioned case, when an influence of a stator resistance R of the AC rotary machine 1 is neglected, Expression (3-2) can be given by Expression (3-3).

$$\begin{bmatrix} i\alpha s \\ i\beta s \end{bmatrix} = \begin{bmatrix} sL\alpha & sL\alpha\beta \\ sL\alpha\beta & sL\beta \end{bmatrix}^{-1} \begin{bmatrix} v\alpha s \\ v\beta s \end{bmatrix} = \quad (3\text{-}3)$$

$$\frac{1}{s^2(L\alpha L\beta - L\alpha\beta^2)} \begin{bmatrix} sL\beta & -sL\alpha\beta \\ -sL\alpha\beta & sL\alpha \end{bmatrix} \begin{bmatrix} v\alpha s \\ v\beta s \end{bmatrix} =$$

$$\frac{1}{(L^2 - 1^2)s} \begin{bmatrix} L - 1\cos2\theta & -1\sin2\theta \\ -1\sin2\theta & L + 1\cos2\theta \end{bmatrix} \begin{bmatrix} v\alpha s \\ v\beta s \end{bmatrix}$$

Moreover, the voltage commands for position estimation Vuh to Vwh can be given by Expression (3-4) in the fixed Cartesian coordinates.

$$\begin{cases} V\alpha sh = V\alpha\beta h \cdot \sin\omega h \cdot t \\ V\beta sh = V\alpha\beta h \cdot \cos\omega h \cdot t \end{cases} \quad (3\text{-}4)$$

where:

$[\alpha sh\ V\beta sh]^T$:

voltages for position estimation in fixed Cartesian coordinates

Vαβh:| amplitude of voltages for position estimation in fixed Cartesian coordinates
ωh: angular frequency of voltages for position estimation When Expression (3-4) is assigned to $[V\alpha s\ V\beta s]^T$ of Expression (3-3) and "s" is jωh, Expression (3-5) is given as below.

$$i\alpha s = \frac{V\alpha\beta h}{(L^2 - 1^2)j\omega h}\{(L - 1\cos2\theta)\sin\omega h \cdot t - 1\sin2\theta\omega h \cdot t\} = \quad (3\text{-}5)$$

$$-j\frac{V\alpha\beta h}{(L^2 - 1^2)\omega h}\sqrt{L^2 + 1^2 - 2L1\cos2\theta} \cdot \sin(\omega h \cdot t - \varphi\alpha)$$

$$i\beta s = \frac{V\alpha\beta h}{(L^2 - 1^2)j\omega h}\{-1\sin2\theta\sin\omega h \cdot t + (L + 1\cos2\theta)\cos\omega h \cdot t\} =$$

$$-j\frac{V\alpha s}{(L^2 - 1^2)\omega h}\sqrt{L^2 + 1^2 + 2L1\cos2\theta} \cdot \cos(\omega h \cdot t + \varphi\beta)$$

where:

$$\varphi\alpha = \tan^{-1}\left(\frac{1\sin2\theta}{L - 1\cos2\theta}\right)$$

$$\varphi\beta = \tan^{-1}\left(\frac{1\sin2\theta}{L + 1\cos2\theta}\right)$$

As can be understood from Expression (3-5), the amplitudes of the respective currents iαs and iβs in the fixed Cartesian coordinates include the rotation position θ.

As described above, the amplitudes Iαs and Iβs of the high-frequency components included in the currents iαs and iβs, respectively, are obtained by the Fourier transformer 192. When calculation given by Expression (3-6) is executed based on the amplitudes Iαs and Iβs obtained by the Fourier transformer 192, a term including the rotation position θ is obtained. The calculation given by Expression (3-6) is implemented by the multiplier 193 and the subtractor 194.

$$\Delta I\alpha\beta = I\beta s^2 - I\alpha s^2 = \left\{ -j\frac{V\alpha\beta h}{(L^2 - l^2)\omega h}\sqrt{L^2 + l^2 + 2Ll\cos2\theta} \right\}^2 - \left\{ -j\frac{V\alpha\beta h}{(L^2 - l^2)\omega h}\sqrt{L^2 + l^2 - 2Ll\cos2\theta} \right\}^2 = \frac{4V\alpha\beta h^2 Ll}{(L^2 - l^2)\omega h^2}\cos2\theta \quad (3\text{-}6)$$

The position calculator 195 divides $\Delta I\alpha\beta$ given by Expression (3-6) by the following term, to thereby obtain cos 2θ.

$$\frac{4V\alpha\beta h^2 Ll}{(L^2 - l^2)\omega h^2}$$

After that, the position calculator 195 calculates the arc cosine of cos 2θ, to thereby calculate θ. The symbol θ calculated as described above corresponds to the estimated rotation position θe.

The configuration of the position calculator 195 may be, for example, as described below in place of the configuration of calculating the arc cosine of cos 2θ. That is, the position calculator 195 may be configured to store a table in which the value of the cos 2θ and the value of θ are associated with each other, and to refer to the table to obtain θ corresponding to cos 2θ as the estimated rotation position θe.

The voltage-command-for-position-estimation generator 17 may be configured to superimpose a voltage command for position estimation having the angular frequency ωh on the voltage Vd or Vq on the rotating two axes. In this case, the position estimator 19 is configured to extract components of the angular frequency ωh contained in the phase current calculation values Ius_cal to Iws_cal, to thereby calculate the estimated rotation position θe.

When the angular velocity ω of the AC rotary machine 1 is high, the position estimator 19 may be configured to apply a publicly-known position estimation method of using an induced voltage of the AC rotary machine 1 to obtain the estimated rotation position θe.

As described above, according to the third embodiment, the controller 8 of the power conversion device is configured to estimate the rotation position θ of the AC rotary machine 1 connected to the output side of the inverter 6 compared to the respective configurations in the first and second embodiments. That is, the controller 8 is configured to control the inverter 6 in accordance with the phase voltage commands Vu to Vw in the three phases superimposed with the voltage commands for position estimation Vuh to Vwh, respectively, and to further estimate the rotation position θ of the AC rotary machine 1 based on the calculated first phase current calculation value and the second phase current calculation value. As a result, it is possible to provide the same effects as those in the first and second embodiments, and the position detector 2 can further be omitted, resulting in contributing to further downsizing and cost reduction of the power conversion device.

Fourth Embodiment

In a fourth embodiment of the present invention, description is given of an electric power steering device including the power conversion device of the first embodiment. In the fourth embodiment, description is omitted for the same points as those of the first to third embodiments, and is mainly given of points different from those of the first to third embodiments.

Figure 14:
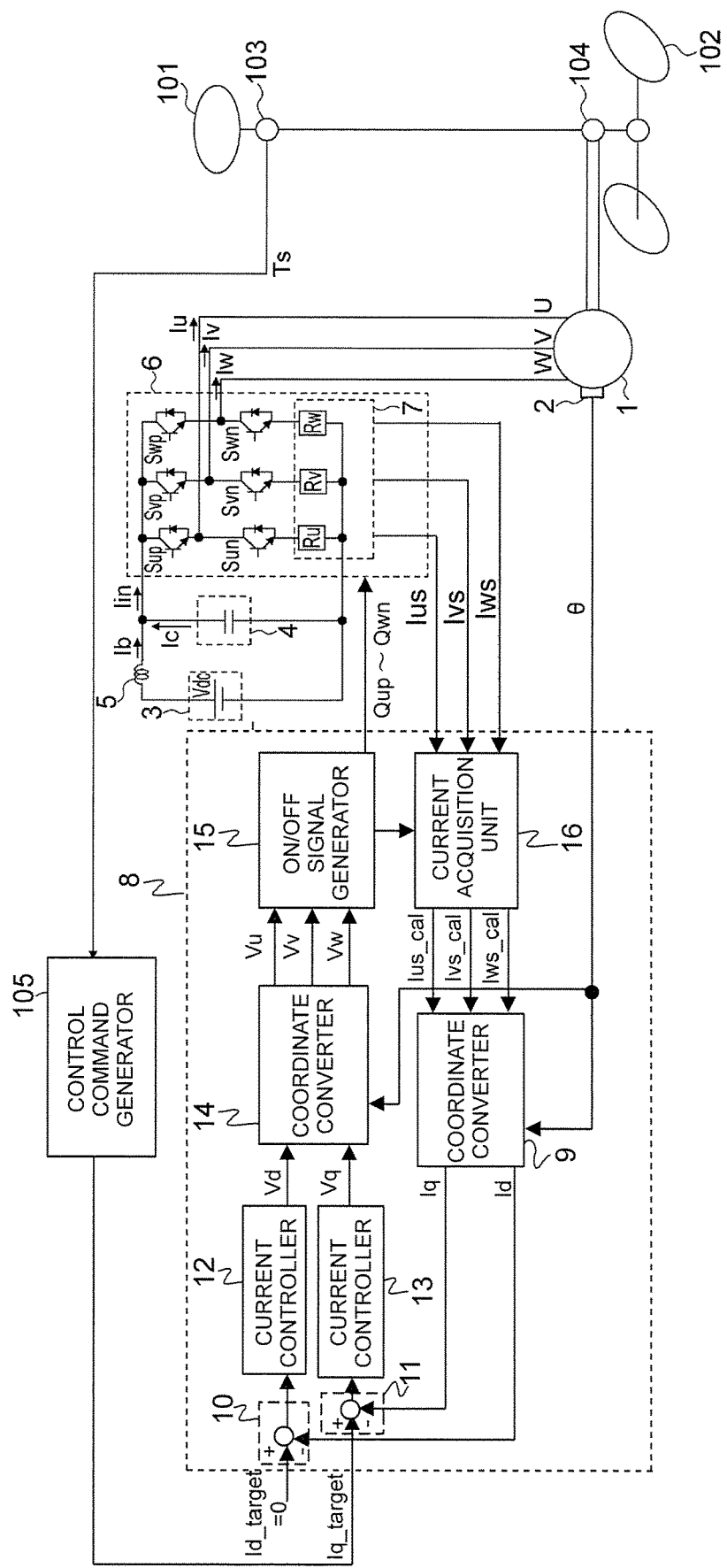
FIG. 14 is a diagram for illustrating an overall configuration of an electric power steering device according to a fourth embodiment of the present invention.

FIG. 14 is diagram for illustrating an overall configuration of the electric power steering device according to the fourth embodiment of the present invention.

A driver of a vehicle in which the electric power steering device is mounted turns a steering wheel 101 leftward and rightward, to thereby steer front wheels 102. A torque detector 103 detects a steering torque Ts of a steering system to output the detected steering torque Ts to a control command generator 105 described later. The AC rotary machine 1 is configured to generate an assist torque for assisting steering by the driver through a gear 104. The AC rotary machine 1 in the fourth embodiment has the same configuration as that of the AC rotary machine 1 in the first embodiment except that the rotor is mechanically connected to the gear 104.

The control command generator 105 calculates a control command for controlling the AC rotary machine 1 so as to be in a desired state based on the steering torque Ts input from the torque detector 103 to output the calculated control command. The control command generator 105 calculates the current command Iq_target as a control command as given by, for example, the following Expression (4-1).

$$Iq\_target = ka \times Ts \quad (4\text{-}1)$$

In Expression (4-1), ka represents a constant, but the value of ka may be set so as to change to correspond to the steering torque Ts or a travel speed of the vehicle. The current command Iq_target is determined as given by Expression (4-1) in this case, but the current command Iq_target may be determined based on publicly-known compensation control corresponding to the steering state.

Description is now given of effects provided by the electric power steering device according to the fourth embodiment.

Downsizing is required in the electric power steering device. The downsizing of the electric power steering device increases ease of mounting to a vehicle, increases a degree of freedom of arrangement, and also contributes to downsizing of the vehicle itself.

Downsizing of passive elements such as capacitors and coils forming the inverter provided in the electric power steering device is directly linked to downsizing of the inverter. Thus, the related art described in Patent Literature 1, that is, the technology of generating PWM signals through use of two carrier wave signals having phases shifted by Tc/2 cycle with each other, is effective.

In the electric power steering device, downsizing of the current detector is also important to achieve downsizing of a system. Consideration is now given of a case in which a current detector similar to the current detector 7 of FIG. 1 is employed as the current detector in order to achieve the downsizing of the current detector in a power conversion device to which the related art is applied. However, in such a current detector, the accuracy of the values of the phase currents acquired by the controller for controlling the inverter of the power conversion device may deteriorate as described above.

To deal with this problem, in the power conversion device according to the first embodiment, as the timings at which the controller 8 configured to control the inverter 6 acquires the current, there are set the timing A and the timing B described in the first embodiment. As a result, even when the current detector 7 of FIG. 1 is employed, it is possible to suppress the deterioration of the accuracy of the values of the phase currents acquired by the controller 8. Thus, with the power conversion device according to the first embodiment, downsizing of the capacitor and the downsizing of the current detector can simultaneously be achieved. As a result, it is possible to provide a significant effect of contributing to downsizing of the electric power steering device.

In the fourth embodiment, the case in which the electric power steering device includes the power conversion device according to the first embodiment is exemplified, but the configuration is not limited to this example. That is, the electric power steering device may include the power conversion device according to one of the second embodiment or the third embodiment.

As described above, according to the fourth embodiment, the electric power steering device includes the power conversion device of one of the first to third embodiments. As a result, this configuration can provide the same effects as those of the first to third embodiments, and further contributes to the downsizing of the electric power steering device.

Each of the functions of the controller 8 of the power conversion device according to the first to third embodiments described above is implemented by a processing circuit. The processing circuit for implementing each of the functions may be dedicated hardware, or a processor configured to execute a program stored in a memory.

When the processing circuit is dedicated hardware, the processing circuit corresponds to, for example, a single circuit, a composite circuit, a programmed processor, a parallel-programmed processor, an application specific integrated circuit (ASIC), a field programmable gate array (FPGA), or a combination thereof. The functions of the respective units of the controller 8 may each be implemented by an individual processing circuit, or may be implemented together by one processing circuit.

Meanwhile, when the processing circuit is the processor, the functions of the respective units of the controller 8 are implemented by software, firmware, or a combination of software and firmware. The software and the firmware are coded as a program and stored in the memory. The processor reads out and executes the program stored in the memory, to thereby implement the function of each of the units.

It is also understood that those programs cause a computer to execute the functions of the respective units described above. In this case, the memory corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory also corresponds to, for example, a magnetic disk, a flexible disk, an optical disc, a compact disc, a MiniDisk, or a DVD.

Some of the functions of the respective units described above may be implemented by dedicated hardware, and others thereof may be implemented by software or firmware.

In this manner, the processing circuit can implement the function of each of the units described above by hardware, software, firmware, or a combination thereof.

The first to fourth embodiments have been described as Examples of the present invention, but the present invention is not limited to the configurations of the first to fourth embodiments. Within the scope not deviating from the gist of the present application, the configurations of the first to fourth embodiments can be combined as appropriate, or can be modified partially or omitted partially.

REFERENCE SIGNS LIST

1 AC rotary machine, 2 position detector, 3 DC power supply, 4 smoothing capacitor, 5 inductance, 6 inverter, 7 current detector, 8 controller, 9 coordinate converter, 10 subtractor, 11 subtractor, 12 current controller, 13 current controller, 14 coordinate converter, 15 on/off signal generator 16 current acquisition unit, 17 voltage-command-for-position-estimation generator, 18 adder, 19 position estimator, 191 three-phase/two-phase converter, 192 Fourier transformer, 193 multiplier, 194 subtractor, 195 position calculator, 101 steering wheel, 102 front wheel, 103 torque detector, 104 gear, 105 control command generator

The invention claimed is:

1. A power conversion device, comprising: an inverter which includes a high electric potential-side switching element and a low electric potential-side switching element which are provided in correspondence with each phase of three phases, and is configured to invert a DC voltage output from a DC power supply to AC voltages by switching on/off the high electric potential-side switching elements and the low electric potential-side switching elements, and to output the AC voltages; a current detector which is connected in series to the respective low electric potential-side switching elements of the inverter, and is configured to detect respective values of phase currents in the three phases as phase current detection values; and a controller configured to calculate phase voltage commands in the three phases, and to control the inverter in accordance with the calculated phase voltage commands in the three phases, wherein the phase voltage commands in the three phases comprises a first phase voltage command, a second phase voltage command, and a third phase voltage command in a first phase, a second phase, and a third phase, respectively, wherein the controller is configured to: compare the phase voltage command in at least one phase of the phase voltage commands in the three phases and a first carrier wave signal to each other, and compare the phase voltage command in a remaining phase of the phase voltage commands in the three phases and a second carrier wave signal different from the first carrier wave signal in phase by ½ cycle of a carrier wave cycle of the first carrier wave signal to each other, to thereby control the high electric potential-side switching elements and the low electric potential-side switching elements of the inverter to switch on and off, wherein the low electric potential-side switching elements comprises a first switching element, a second switching element, and a third switching element corresponding to the first phase, the second phase, and the third phase, respectively; acquire, from the current detector at a timing A at which the first switching element corresponding to the first phase is turned on, a first phase current detection value in the first phase based on a comparison between the first phase voltage command and the first carrier wave signal, acquire the first phase current detection value from the current detector at a timing B at which the first switching element is turned off, as a first offset current value, and calculate a first corrected phase current calculation value corresponding to the first phase, by subtracting the first offset current value acquired at the timing B from the first phase current detection value acquired at the timing A; and acquire, from the current detector at the timing B at which the second switching element corresponding to the second phase is turned on, a second phase current detection value in the second phase based on a comparison between the second phase voltage command and the second carrier wave signal, acquire the second phase current detection value from the current detector at the timing A at which the second switching element is turned off, as a second offset current value, and calculate a second corrected phase current calculation value corresponding to the second phase by subtracting the second offset current value acquired at the timing A from the second phase current detection value acquired at the timing B.

2. The power conversion device according to claim 1,
wherein the timing A is a timing at which the low electric potential-side switching element corresponding to the first phase is turned on when the phase voltage command in the first phase is zero, and
wherein the timing B is a timing at which the low electric potential-side switching element corresponding to the second phase is turned on when the phase voltage command in the second phase is zero.

3. The power conversion device according to claim 1, wherein the timing B is shifted by ½ cycle of the carrier wave cycle with respect to the timing A, and
wherein a maximum value of the first carrier wave signal and the second carrier wave signal matches one of the phase voltage commands in the three phases, and a midpoint between the maximum value and a minimum value of each of the first carrier wave signal and the second carrier wave signal is less than all the phase voltage commands in the three phases.

4. The power conversion device according to claim 3,
wherein the first carrier wave signal takes a maximum value at the timing A, and
wherein the first carrier wave signal takes a minimum value at the timing B.

5. The power conversion device according to claim 1, wherein the controller is configured to execute the calculation of the phase voltage commands in the three phases at a cycle which is a natural number multiple of the carrier wave cycle, the natural number being equal to or larger than two.

6. The power conversion device according to claim 1, wherein the controller is configured to use an average value of the first phase current detection value acquired at the latest timing A and the first phase current detection value acquired at the previous timing A before the latest timing A when the first phase current calculation value is calculated.

7. The power conversion device according to claim 1, wherein the controller is configured to use an average value of the second phase current detection value acquired at the latest timing B and the second phase current detection value acquired at the previous timing B before the latest timing B when the second phase current calculation value is calculated.

8. The power conversion device according to claim 1, wherein the controller is configured to:
control the inverter in accordance with the phase voltage commands in the three phases superimposed with voltage commands for position estimation; and
estimate a rotation position of an AC rotary machine connected to an output side of the inverter based on the calculated first phase current calculation value and the calculated second phase current calculation value.

9. An electric power steering device, comprising the power conversion device of claim 1.

10. A power conversion device, comprising:
an inverter which includes a high electric potential-side switching element and a low electric potential-side switching element which are provided in correspondence with each phase of three phases, and is configured to invert a DC voltage output from by a DC power supply to AC voltages by switching on/off the high electric potential-side switching elements and the low electric potential-side switching elements, and to output the AC voltages;
a current detector configured to detect, as a bus current detection value, a value of a bus current input from the DC power supply to the inverter; and
a controller configured to calculate phase voltage commands in the three phases, and to control the inverter in accordance with the calculated phase voltage commands in the three phases,
wherein the phase voltage commands in the three phases are set as a maximum phase voltage command, a medium phase voltage command, and a minimum phase voltage command in descending order of a magnitude of value,
wherein the controller is configured to:
apply a first voltage shift method of equally shifting the respective phase voltage commands in the three phases such that the maximum phase voltage command matches a maximum value of a first carrier wave signal or a second voltage shift method of equally shifting the respective phase voltage commands in the three phases such that the minimum phase voltage command matches a minimum value of the first carrier wave signal;
compare the phase voltage command in at least one phase of the shifted phase voltage commands in the three phases and the first carrier wave signal to each other, and compare the phase voltage command in a remaining phase of the shifted phase voltage commands in the three phases and a second carrier wave signal different from the first carrier wave signal in phase by ½ cycle of a carrier wave cycle of the first carrier wave signal to each other, to thereby control the high electric potential-side switching elements and the low electric potential-side switching elements of the inverter to switch on and off;
acquire the bus current detection value from the current detector at each of a timing A, a timing B, and a timing C between the timing A and the timing B, and calculate, based on the bus current detection values acquired at the timing A and the timing B, a first phase current calculation value corresponding to a first phase being a phase corresponding to the phase voltage command to be compared to the first carrier wave signal and a second phase current calculation value corresponding to a second phase being a phase corresponding to the phase voltage command to be compared to the second carrier wave signal; and
calculate the first phase current calculation value and the second phase current calculation value based on the bus current detection value acquired at the timing A, the bus current detection value acquired at the timing B, and an offset current value equivalent to the bus current detection value acquired at the timing C,
wherein the timing A and the timing B are timings different from each other, and are timings at which the bus current is flowing from the DC power supply to the inverter, and
wherein the bus current from the DC power supply to the inverter is interrupted at the timing C.

11. The power conversion device according to claim 10, wherein the timing B is shifted by ½ cycle of the carrier wave cycle with respect to the timing A.

12. The power conversion device according to claim 11,
wherein the first carrier wave signal takes a maximum value at the timing A, and
wherein the first carrier wave signal takes a minimum value at the timing B.

13. The power conversion device according to claim 10, wherein, when the first voltage shift method is applied, the controller is configured to calculate the first phase current calculation value based on the bus current detection value acquired at the timing A, and to calculate the second phase current calculation value based on the bus current detection value acquired at the timing B.

14. The power conversion device according to claim 10, wherein, when the second voltage shift method is applied, the controller is configured to calculate the second phase current calculation value based on the bus current detection value acquired at the timing A, and to calculate the first phase current calculation value based on the bus current detection value acquired at the timing B.

15. The power conversion device according to claim 10, wherein the timing C is at a center in a period from the timing A to the timing B.

16. The power conversion device according to claim 10, wherein the timing C is later by ½ of a period required for the controller to acquire the bus current detection value with respect to a center of the period from the timing A to the timing B.

17. A power conversion device, comprising:
an inverter which includes a high electric potential-side switching element and a low electric potential-side switching element which are provided in correspondence with each phase of three phases, and is configured to invert a DC voltage output from by a DC power supply to AC voltages by switching on/off the high electric potential-side switching elements and the low electric potential-side switching elements, and to output the AC voltages;
a current detector configured to detect, as a bus current detection value, a value of a bus current input from the DC power supply to the inverter; and
a controller configured to calculate phase voltage commands in the three phases, and to control the inverter in accordance with the calculated phase voltage commands in the three phases,
wherein the phase voltage commands in the three phases are set as a maximum phase voltage command, a medium phase voltage command, and a minimum phase voltage command in descending order of a magnitude of value,
wherein the controller is configured to:
apply a first voltage shift method of equally shifting the respective phase voltage commands in the three phases such that the maximum phase voltage command matches a maximum value of a first carrier wave signal or a second voltage shift method of equally shifting the respective phase voltage commands in the three phases such that the minimum phase voltage command matches a minimum value of the first carrier wave signal;
compare the phase voltage command in at least one phase of the shifted phase voltage commands in the three phases and the first carrier wave signal to each other, and compare the phase voltage command in a remaining phase of the shifted phase voltage commands in the three phases and a second carrier wave signal different from the first carrier wave signal in phase by ½ cycle of a carrier wave cycle of the first carrier wave signal to each other, to thereby control the high electric potential-side switching elements and the low electric potential-side switching elements of the inverter to switch on and off;
acquire the bus current detection value from the current detector at each of a timing A and a timing B, and calculate, based on the bus current detection values acquired at the timing A and the timing B, a first phase current calculation value corresponding to a first phase being a phase corresponding to the phase voltage command to be compared to the first carrier wave signal and a second phase current calculation value corresponding to a second phase being a phase corresponding to the phase voltage command to be compared to the second carrier wave signal, and
wherein the timing A and the timing B are timings different from each other, and are timings at which the bus current is flowing from the DC power supply to the inverter, and
wherein the controller is configured to:
further acquire the bus current detection value from the current detector at a timing C between the timing A and the timing B, the bus current from the DC power supply to the inverter being interrupted at the timing C;
further acquire the bus current detection value from the current detector at a timing D, the bus current from the DC power supply to the inverter being interrupted at the timing D, the timing A being between the timing D and the timing C; and
calculate the first phase current calculation value and the second phase current calculation value based on the bus current detection value acquired at the timing A, the bus current detection value acquired at the timing B, and an offset current value equivalent to an average value of the bus current detection value acquired at the timing C and the bus current detection value acquired at the timing D.

* * * * *